(12) United States Patent
Kuisma

(10) Patent No.: US 11,320,266 B2
(45) Date of Patent: May 3, 2022

(54) GYROSCOPE WITH LOCKED SECONDARY OSCILLATION FREQUENCY

(71) Applicant: MURATA MANUFACTURING CO., LTD., Nagaokakyo (JP)

(72) Inventor: Heikki Kuisma, Helsinki (FI)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 17/196,525

(22) Filed: Mar. 9, 2021

(65) Prior Publication Data

US 2021/0285768 A1  Sep. 16, 2021

(30) Foreign Application Priority Data

Mar. 16, 2020 (FI) ..................................... 20205270

(51) Int. Cl.
*G01C 19/5776* (2012.01)
*G01C 19/5712* (2012.01)
*G01C 19/02* (2006.01)

(52) U.S. Cl.
CPC ......... *G01C 19/5712* (2013.01); *G01C 19/02* (2013.01); *G01C 19/5776* (2013.01)

(58) Field of Classification Search
CPC . G01C 19/5712; G01C 19/02; G01C 19/5776
See application file for complete search history.

(56) References Cited

U.S. PATENT DOCUMENTS

| | | | | |
|---|---|---|---|---|
| 3,854,341 A * | 12/1974 | Quermann | ............. | G01C 19/02 74/5.7 |
| 5,481,914 A * | 1/1996 | Ward | ................. | G01C 19/5719 73/504.16 |
| 5,600,064 A * | 2/1997 | Ward | ................. | G01C 19/5719 73/504.03 |
| 5,604,309 A * | 2/1997 | Ward | ................. | G01C 19/5719 702/41 |
| 5,806,364 A * | 9/1998 | Kato | ................... | G01D 3/0365 310/315 |
| 2006/0250194 A1 | 11/2006 | Spahlinger | | |
| 2006/0260382 A1 | 11/2006 | Fell et al. | | |
| 2006/0266099 A1 | 11/2006 | Schroeder | | |
| 2010/0212424 A1 | 8/2010 | Malvern et al. | | |

(Continued)

FOREIGN PATENT DOCUMENTS

EP    2 466 257 A1    6/2012
JP    2019-174368 A   10/2019

OTHER PUBLICATIONS

Finnish Search Report dated Oct. 30, 2020 corresponding to Finnish Patent Application No. 20205270.

(Continued)

*Primary Examiner* — David J Bolduc
(74) *Attorney, Agent, or Firm* — Squire Patton Boggs (US) LLP

(57) ABSTRACT

A microelectromechanical gyroscope comprising a force-feedback circuit with a sideband modulator configured to impart to a mechanical oscillator a modulated force-feedback signal, and a frequency-feedback circuit which receives from the oscillator a modulated sense signal and is configured to keep the phase of the secondary resonant frequency of the oscillator equal to its primary oscillation frequency.

8 Claims, 18 Drawing Sheets

(56) References Cited

U.S. PATENT DOCUMENTS

| | | | |
|---|---|---|---|
| 2010/0263445 A1 | 10/2010 | Hayner et al. | |
| 2011/0192226 A1* | 8/2011 | Hayner | G01C 19/5776 |
| | | | 73/504.12 |
| 2015/0377625 A1* | 12/2015 | Aaltonen | G01C 19/5726 |
| | | | 73/504.12 |
| 2016/0109258 A1* | 4/2016 | Boser | G01C 19/5726 |
| | | | 73/504.12 |
| 2016/0334213 A1* | 11/2016 | DeWall | G01C 19/5684 |
| 2017/0167873 A1* | 6/2017 | Coronato | G01C 19/5776 |
| 2017/0328712 A1* | 11/2017 | Collin | H03D 7/00 |
| 2018/0094929 A1* | 4/2018 | Gattere | G01C 19/574 |
| 2019/0078889 A1* | 3/2019 | Facchinetti | G01C 19/5712 |
| 2020/0109945 A1* | 4/2020 | Kuisma | G01C 19/5712 |

OTHER PUBLICATIONS

European Search Report dated Jul. 2, 2021 corresponding to European Patent Application No. 21157558.

* cited by examiner

221

223

231

253

261

262

262

GYROSCOPE WITH LOCKED SECONDARY OSCILLATION FREQUENCY

FIELD OF THE DISCLOSURE

This disclosure relates to gyroscopes with mobile proof masses, and more particularly to gyroscopes where force-feedback is implemented. The present disclosure further concerns the control of the secondary resonance mode in such gyroscopes.

BACKGROUND OF THE DISCLOSURE

Microelectromechanical (MEMS) gyroscopes can comprise one or more Coriolis masses that are driven into a primary oscillation mode (which may also be called the drive oscillation mode) by one or more drive transducers which are coupled to the Coriolis mass either directly or indirectly (via a separate drive mass, for example). The Coriolis masses can also be easily actuated into a secondary oscillation mode (which may also be called the sense oscillation mode) by the Coriolis force when the gyroscope undergoes angular rotation. One or more sense transducers are coupled to a Coriolis mass for measuring the momentary amplitude of the secondary oscillation. This amplitude is proportional to the angular rotation rate at that moment. The signal from the sense transducer may be called a sense signal.

Coriolis masses are typically suspended from an adjacent fixed structure by flexible suspenders, which may also be called springs or suspension springs. The point where a spring is attached to a fixed structure may be called an anchor point. Suspenders are dimensioned to allow the primary oscillation mode and the secondary oscillation mode of the Coriolis mass, so that the mass is configured to be mobile in the desired directions. If the mass lacks other means of support, the suspenders need to be rigid in at least one direction to keep the attached mass elements centred at a particular place as it oscillates.

It is sometimes beneficial to implement a force-feedback system which uses the amplitude and phase information contained in the sense signal to send a corresponding force-generating voltage to one or more force-feedback transducers which are also coupled to the Coriolis mass. With a suitably arranged force-feedback system, the force-feedback transducers may be configured to generate a counter-force which is closely synchronized with the secondary oscillation, so that the amplitude of the secondary oscillation in the Coriolis mass is reduced almost to zero even as the Coriolis force acts on the Coriolis mass. The amplitude of the in-phase (same phase as the Coriolis force) component of the force-generating voltage required to keep the Coriolis mass stationary (or almost stationary) at each moment will then be proportional to the momentary angular rotation rate.

The Coriolis mass typically oscillates in resonance in its primary oscillation mode in order to achieve a high amplitude with limited generating force. For a maximal signal-to-noise ratio it would be beneficial to operate it in resonance also in its secondary oscillation mode, but this may not be possible without force-feedback that damps the secondary resonance and widens the bandwidth. The Coriolis force is relatively weak, so resonance amplification of the secondary oscillation amplitude is vital for obtaining a sufficiently strong sense signal. However, it is also vital for the accuracy of the gyroscope that the primary oscillation frequency, which sets the Coriolis mass into resonance oscillation in its primary oscillation mode, should be substantially equal to the secondary resonant frequency at which the Coriolis mass resonates in the secondary oscillation mode. Using force feed-back is greatly beneficial in the operation of a gyroscope since it will damp the sharp resonance of the secondary resonator and give the frequency response a sufficiently wide bandwidth, so that the primary oscillation and secondary resonant frequencies can be easily matched or nearly matched. This produces a greatly enhanced signal to noise ratio compared to a conventional gyroscope where the secondary and primary frequencies can't be easily matched. In a conventional gyroscope without force-feedback, the phase shift of the secondary resonator as a function of frequency changes very rapidly at the resonant frequency and great instability of the phase shift and thus the detected in-phase signal would result from matching the two resonant frequencies if even a very slight frequency shift of either the primary or the secondary resonator would occur. In a force-feedback system the phase changes much more slowly as a function of frequency and very little instability will occur due to slight frequency variations.

In conventional as well as force-feedback gyroscopes, design restrictions and small manufacturing inaccuracies may sometimes lead to a mismatch between the primary oscillation and secondary resonant frequencies of the Coriolis mass. The primary oscillation and secondary resonant frequencies may also be initially equal but gradually drift apart due to ageing and/or thermal effects. Frequency-feedback can be used to counter this undesired mismatch by forcing the secondary resonant frequency to a value which is substantially equal to the primary oscillation frequency. It is well known that the resonant frequency of a mechanical resonator can be lowered electrically by changing the bias voltage present at electrodes attached to the resonating mass. This effect can be used to actuate the frequency adjustment.

Document EP2466257 discloses a gyroscope where a frequency-feedback system is used in a force-feedback gyroscope for matching the secondary frequency to the primary frequency by introducing pilot tones to the oscillating system and then estimating a force transfer function and thus the secondary resonant frequency. A force-feedback gyroscope is very suitable for using pilot tones since the frequency characteristic of the secondary resonator is wide band due to the closed loop force-feedback. The pilot tones can thus be placed far apart from the centre frequency so that they will not interfere with the Coriolis signal, which usually has a limited bandwidth of maximally a few hundred hertz. However, in EP2466257 nothing is disclosed about a practical way to generate the pilot tones or about estimation of the frequency response and the secondary resonant frequency based on the transmitted pilot tones. Another problem with this arrangement is that the frequency-matching can be easily disturbed by external vibrations. Vibrations at frequencies lying within the signal bandwidth of a pilot tone will render that pilot tone useless and it is not trivial to detect the possible interference so that the affected pilot tone could be ignored.

BRIEF DESCRIPTION OF THE DISCLOSURE

An object of the present disclosure is to provide an apparatus for generating pilot tones, evaluating the frequency response and for alleviating the disadvantages presented above.

The object of the disclosure is achieved by an arrangement which is characterized by what is stated in the independent claims. The preferred embodiments of the disclosure are disclosed in the dependent claims.

The disclosure is based on the idea of adding to the force feedback signal a sideband signal doubly modulated from a primary oscillation signal, demodulating this sideband signal after it has propagated through the secondary resonator and comparing the phase of the demodulated signal with the phase of the original primary oscillation signal.

BRIEF DESCRIPTION OF THE DRAWINGS

In the following the disclosure will be described in greater detail by means of preferred embodiments with reference to the accompanying drawings, in which FIG. 1 explains illustrations used in FIG. 2a;

FIGS. 8b-8c illustrate the effect of a disturbing vibration on the system of FIG. 2a.

FIGS. 8d-8e illustrate frequency spectra in the system of FIG. 8a.

FIGS. 8f-8g illustrate the effect of a disturbing vibration on the system of FIG. 8a.

DETAILED DESCRIPTION OF THE DISCLOSURE

Figure 1:
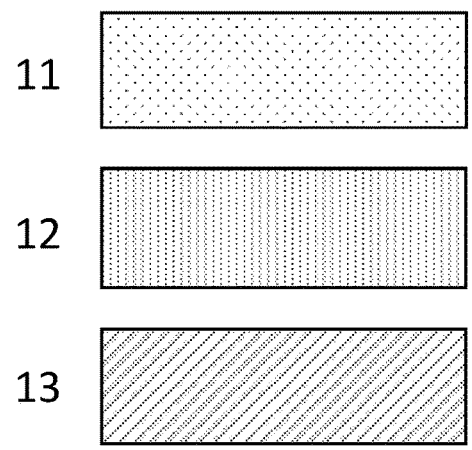

This disclosure describes a microelectromechanical gyroscope which comprises at least one Coriolis mass which is coupled to a drive transducer. The drive transducer receives as input a drive signal and actuates the Coriolis mass into primary oscillation movement at a primary oscillation frequency $F_{prim}$. The Coriolis mass is configured to be actuated into secondary oscillation movement by the Coriolis force when the gyroscope undergoes angular rotation, wherein the secondary oscillation has a secondary resonant frequency $F_{sec}$.

The gyroscope also comprises a drive sensing circuit comprising a drive sensing transducer which is coupled to the Coriolis mass and configured to generate an original drive tracking signal which tracks the primary oscillation movement of the Coriolis mass.

The gyroscope also comprises a readout circuit comprising a sense transducer which is coupled to the Coriolis mass and configured to generate a sense signal which tracks the secondary oscillation movement of the Coriolis mass. The readout circuit comprises a filter which receives the sense signal as input and outputs a filtered sense signal.

The gyroscope also comprises a force-feedback system comprising a force-feedback transducer coupled to the Coriolis mass and a force feedback circuit coupled to the force-feedback transducer. The force feedback circuit is configured to receive the filtered sense signal and the original drive tracking signal as input and to output to the force-feedback transducer a force-feedback signal.

The force-feedback circuit comprises a first sideband modulator which is configured to receive the original drive tracking signal as input, to modulate the original drive tracking signal with a first modulation frequency and to output a first sideband signal. The force-feedback circuit further comprises a second sideband modulator which is configured to receive the first sideband signal as input, to modulate the first sideband signal with a second modulation frequency and to output a second sideband signal.

The force-feedback circuit also comprises a summing element which is configured to receive the filtered sense signal and the second sideband signal as input, to sum them together to generate the force-feedback signal and to output the force-feedback signal to the force-feedback transducer.

The gyroscope further comprises a frequency-feedback circuit coupled to the readout circuit. The frequency-feedback circuit comprises a phase comparator which is configured to receive the filtered sense signal and a reference signal as input. The reference signal is either the original drive tracking signal or a phase-shifted drive tracking signal which differs from the original drive tracking signal only in its phase. The phase comparator is further configured to compare the phase of the filtered sense signal with the phase of the reference signal and to output a phase comparison signal based on this comparison.

The frequency-feedback circuit further comprises a first sideband demodulator and a second sideband demodulator. Either the filtered sense signal or the reference signal is demodulated in the first sideband demodulator at the first modulation frequency before entering the phase comparator. Either the filtered sense signal or the reference signal is demodulated in the second sideband demodulator at the second modulation frequency before entering the phase comparator.

The frequency-feedback circuit further comprises a controller which is configured to receive the phase comparison signal as input and to use the phase comparison signal for keeping the sense signal phase shift at $-\pi$ at the primary resonant frequency $F_{prim}$.

The filter will at least adjust the phase shift of the feed-back loop so that the force feed-back will be stable, but it may also filter out unwanted frequencies and prevent instability at higher resonant modes. The filter may be a phase shifter, a differentiator, an integrator, a low-pass, high-pass, band-pass or all-pass filter or a combination thereof. The sense signal is typically passed through an amplifier before it reaches the filter, or the filter function may have been incorporated in the amplifier.

The first sideband signal may comprise at least a first signal component at a first sideband frequency $F_{prim}-F_{mod1}$ and a second signal component at a second sideband frequency $F_{prim}+F_{mod1}$. The second sideband signal may comprise components at least at a first sideband frequency $F_{prim}-F_{mod1}-F_{mod2}$, a second sideband frequency $F_{prim}+F_{mod1}-F_{mod2}$, a third sideband frequency $F_{prim}-F_{mod1}+F_{mod2}$ and a fourth sideband frequency $F_{prim}+F_{mod1}+F_{mod2}$.

In this disclosure, the oscillation of the Coriolis mass may be referred to as oscillation which occurs in the "mechanical domain". Circuits, such as the readout circuit, the force-feedback circuit and the frequency-feedback circuit, comprise an "analogue domain" with electronic elements such as resistors, capacitors and inductors, as well as amplifiers and filters which have been formed by combining such electronic elements. These circuits may also comprise digital elements which operate on signals in the "digital domain".

Figure 2A:
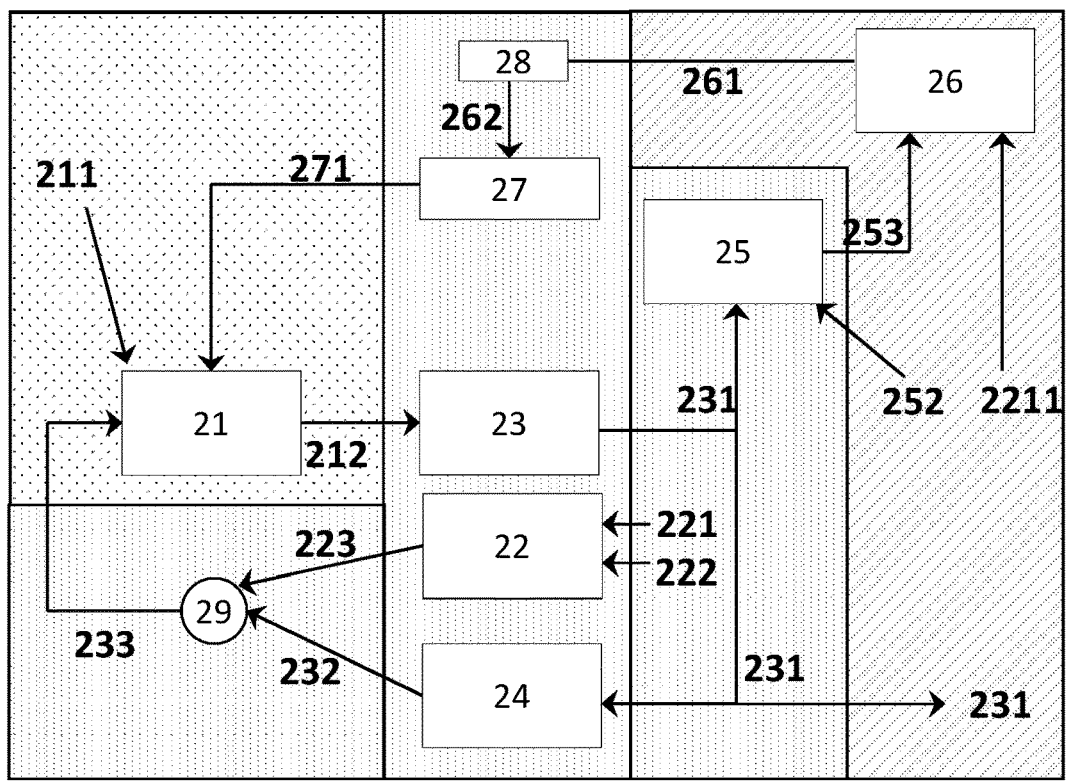
FIGS. 2a-2f illustrate the general principles of force- and frequency-feedback.

Parts of some embodiments described in this disclosure can be implemented either in the analogue domain or in the digital domain. FIGS. 1 and 2a illustrate one possible implementation. Circuit elements marked with the dotted area 11 indicate the mechanical domain, while elements marked with the vertical lines 12 indicate the analogue domain and the elements marked with the diagonal lines 13 indicate the digital domain. Transducers are not illustrated in FIG. 2a, but each interface between the analogue and mechanical domains comprises a force/voltage transducer. Each interface between the analogue and digital domains may comprise an A/D or D/A converter. These converters have not been separately illustrated, either. There are many alternatives to the domain implementation illustrated in FIG. 2a. For example, filters, phase detectors, modulators and demodulators can typically all be implemented either in the analogue or the digital domain.

In this disclosure, the term "transducer" refers to a device which either converts an input variable, such as a voltage, into a force which acts on the Coriolis mass, or produces an output variable, such as a voltage, based on the displacement of the Coriolis mass. The former function is primarily performed by drive transducers and force-feedback transducers, and the latter primarily by sense transducers, but all transducers are applicable for force production and displacement measurement if necessary and a single transducer can be used for both functions if multiplexed in the time domain to a circuitry with a high enough frequency. The transducers may for example be capacitive transducers which comprise a set of capacitor electrodes on a fixed structure paired with a set of adjacent capacitor electrodes on the Coriolis mass and electric connections which facilitate voltage input and output to these electrodes. Alternatively, the transducers may be piezoelectric transducers which comprise a piezoelectric element placed on the suspenders which support the Coriolis mass and electric connections which facilitate voltage input and output to these elements.

The drive sensing transducer measures the primary oscillation movement of the Coriolis mass. The drive tracking signal obtains a frequency which is equal the primary oscillation frequency $F_{prim}$. Depending on the resonance properties of the primary oscillation mode, this primary oscillation frequency may be equal to the primary resonant frequency, or it may deviate to some extent from the primary resonant frequency.

Feedback Principles

The general principles of combined force- and frequency-feedback will be explained next, with reference to FIG. 2a. This figure illustrates a microelectromechanical gyroscope with a Coriolis mass 21. This Coriolis mass has been driven by a drive signal and drive transducer (not illustrated) to oscillate in a primary oscillation mode at a drive oscillation frequency $F_{prim}$. When the gyroscope experiences angular rotation, the Coriolis force will impart a mechanical input signal 211 to the Coriolis mass which maintains the secondary oscillation mode of the Coriolis mass as long as the gyroscope rotates. The gyroscope is designed to detect the amplitude of the mechanical input signal 211. The frequency of the mechanical input signal 211 due to Coriolis force is always the primary oscillation frequency $F_{prim}$.

The secondary oscillation of the Coriolis mass converts the mechanical input signal 211 into a sense signal 212 which can be measured by sensing the movement of the Coriolis mass with a sense transducer. The amplitude and phase of the sense signal 212 will be influenced by the properties of the secondary resonator with resonant frequency $F_{sec}$. The readout circuit of the gyroscope comprises an amplifier and a filter 23 which at least conditions the signal to high amplitude level and provides a proper phase for the closed feed-back loop. It may also filter out unwanted frequency components and improve the stability of the feed-back loop.

The force-feedback system comprises a force-feedback transducer at the interface between the analogue and mechanical domains. The force-feedback system also comprises a force-feedback circuit which receives the conditioned sense signal 231 as input. The force-feedback circuit comprises a gain block 24 which amplifies the conditioned sense signal 231 and feeds the amplified sense signal 232 to summing element 29. The summing element outputs a force-feedback signal 233 back to the Coriolis mass 21 to damp the secondary resonance occurring at the secondary resonant frequency $F_{sec}$. The gain block may alternatively be placed within the readout-circuit so that the frequency-feedback circuit also receives the amplified sense signal 232 as input, and so that the output signal, 231 at the bottom of the FIG. 2a, also is an amplified sense signal.

In a stabilized force-feedback loop, where the amplitude of the secondary oscillation has been reduced to zero or almost zero, the sense signal 231 determines the force required to keep the Coriolis mass stationary and this signal can be read as the gyroscope output.

Figure 2B:
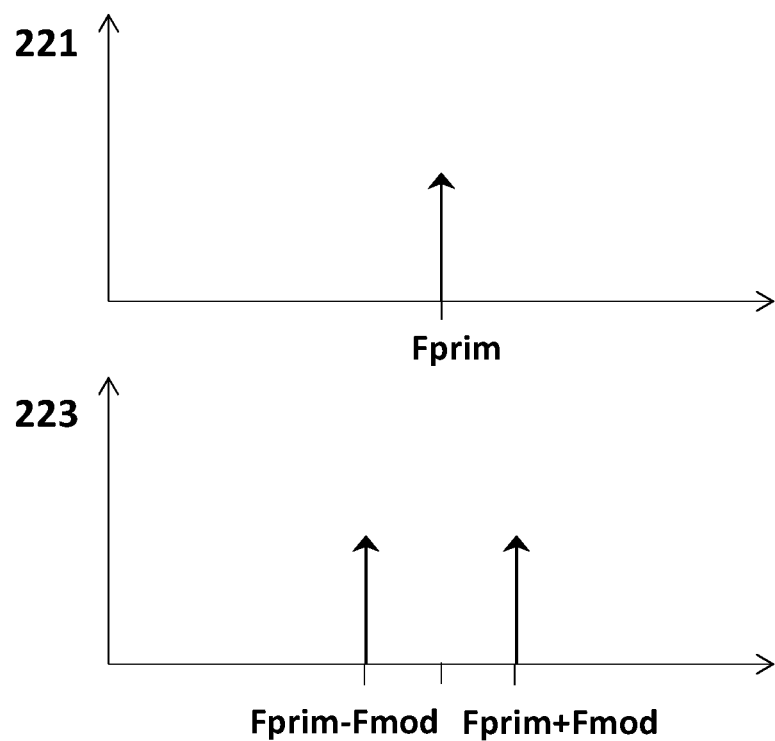

The force feedback circuit in FIG. 2a also comprises a sideband modulator 22. The sideband modulator receives as input the drive tracking signal 221 (with frequency $F_{prim}$) and a modulation signal 222. The frequency of the modulation signal is $F_{mod}$. The sideband modulator produces a two-sideband signal 223. FIG. 2b illustrates the drive tracking signal 221 and the two-sideband signal 223. The two-sideband signal comprises two components, one which has been shifted from $F_{prim}$ in the negative direction by the modulation $F_{mod}$ obtained from the modulation signal, and another component which has been shifted from $F_{prim}$ in the positive direction by the same amount. The sideband signal 223 has no component at the primary oscillation frequency $F_{prim}$.

Figure 2C:
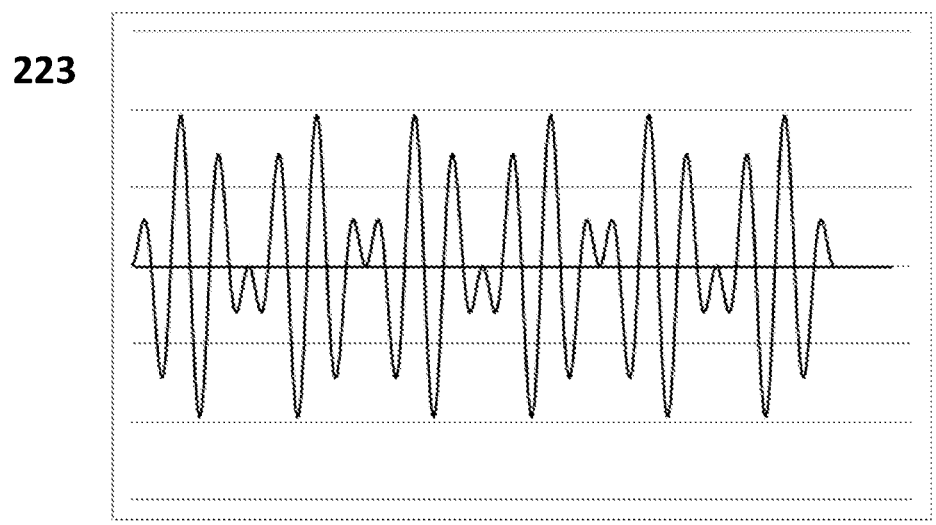

The sidebands illustrated at the bottom of FIG. 2b can for example be obtained in the sideband modulator 22 by multiplying the sinusoidal drive tracking signal C21=sin($\omega_{prim}t$) by a sinusoidal modulation signal 222=sin($\omega_{mod}t$):

$$223 = \sin(\omega_{mod}t) \cdot \sin(\omega_{prim}t) = 0.5 \cdot [\cos(\omega_{prim}+\omega_{mod})t - \cos(\omega_{prim}-\omega_{mod})t], \quad (1)$$

where $\omega_{mod}=2\pi F_{mod}$ and $\omega_{prim}=2\pi F_{prim}$. The waveform of such a sinus-modulated sideband signal 223 with two sidebands is illustrated in FIG. 2c.

Figure 2D:
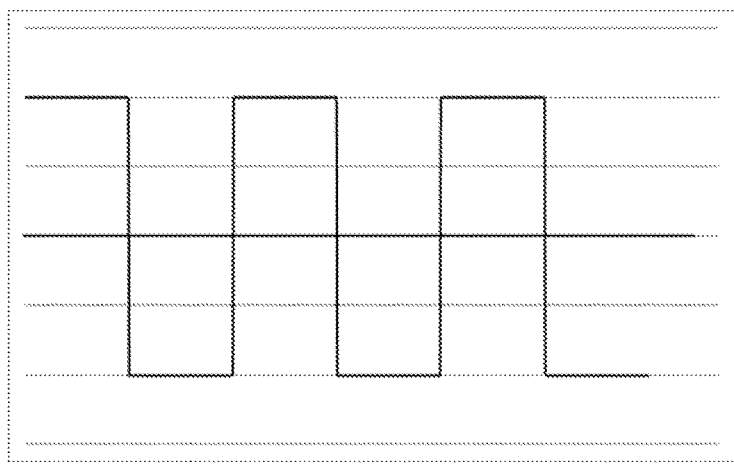
Figure 2E:
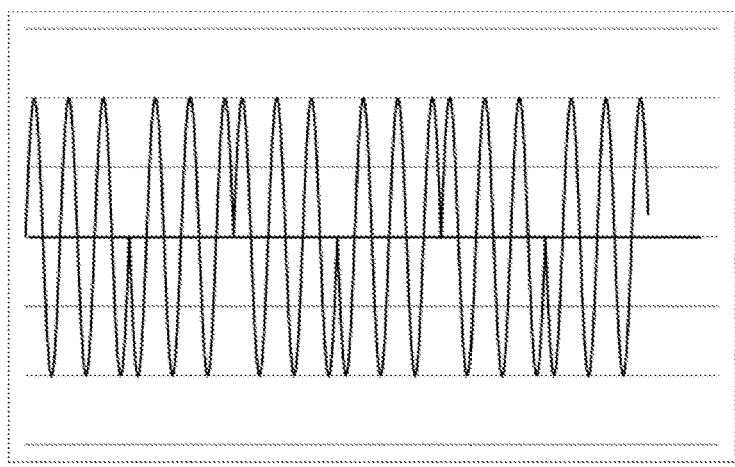
Figure 2F:
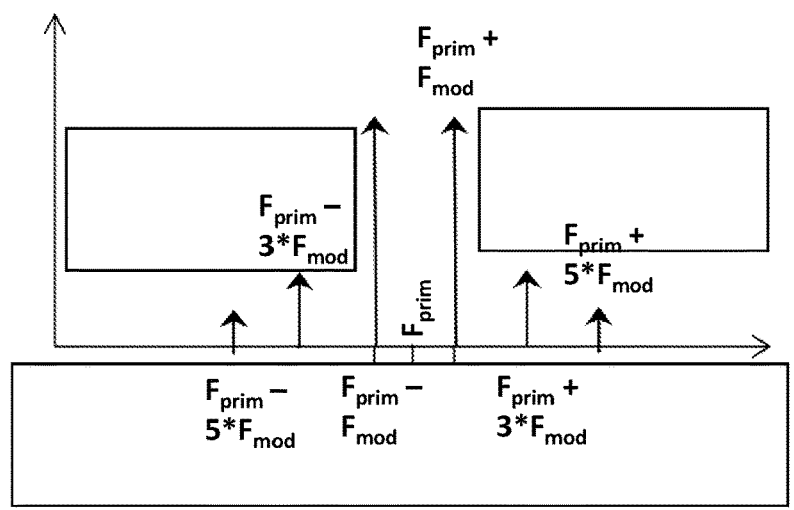

A simpler way, especially in the analogue domain, to produce the two-sideband signal 223 is to use a square-wave modulation signal 222, illustrated in FIG. 2d. This produces a sideband signal with the waveform illustrated in FIG. 2e, containing modulated signal components not only at the basic frequency of the square-wave, but also at all odd harmonic frequencies of the basic frequency, as FIG. 2f illustrates. However, these harmonic sidebands do not make any practical difference since they can easily be filtered by the secondary resonator 21 and by the conditioning filter in 23.

Regardless of how the two-sideband signal is generated, the drive tracking signal 221 is modulated so that at least two sidebands are formed in the two-sideband signal 223, one on each side of the primary frequency $F_{prim}$, and no signal component is present at the primary frequency. The two-sideband signal 223 is summed to the amplified sense signal 232 in summing element 29. The force-feedback signal 233 thereby contains a periodic modulation, and a corresponding periodically modulated force is imparted by the force-feedback transducer to the Coriolis mass. This modulation will then also be present in the sense signal 212. In the circuit illustrated in FIG. 2a, the force-feedback signal 233 may be an analogue voltage signal which is imparted to the force-feedback system by outputting a corresponding force-feedback voltage to the force-feedback transducer. Additionally, the force-feedback transducer may require a bias voltage added to the force-feedback voltage in order to generate the required force.

The summing element 29 may be any generic force-summing element which generates a sum force based on the two inputs 223 and 232, for example by summing the corresponding voltage inputs and then transmitting the sum voltage signal 233 to one or more force-feedback transducers. The summing element 29 could alternatively transmit one voltage input 223 directly to a first force-feedback transducer (or first set of force-feedback transducers) and the other voltage input 232 directly to a second force-feedback transducer (or set of force-feedback transducers), without summing the actual signals.

Figure 3:
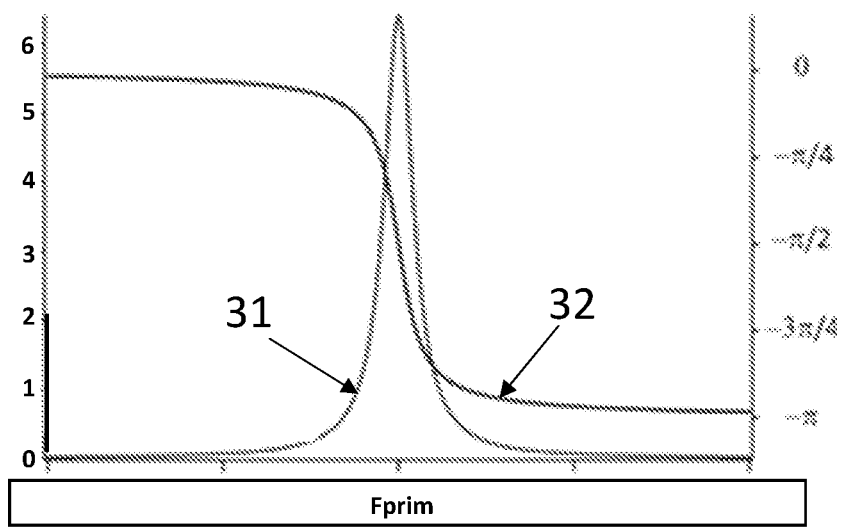
FIG. 3 illustrates the oscillation amplitude and oscillation phase of a mechanical resonator without force-feedback.
Figure 4:
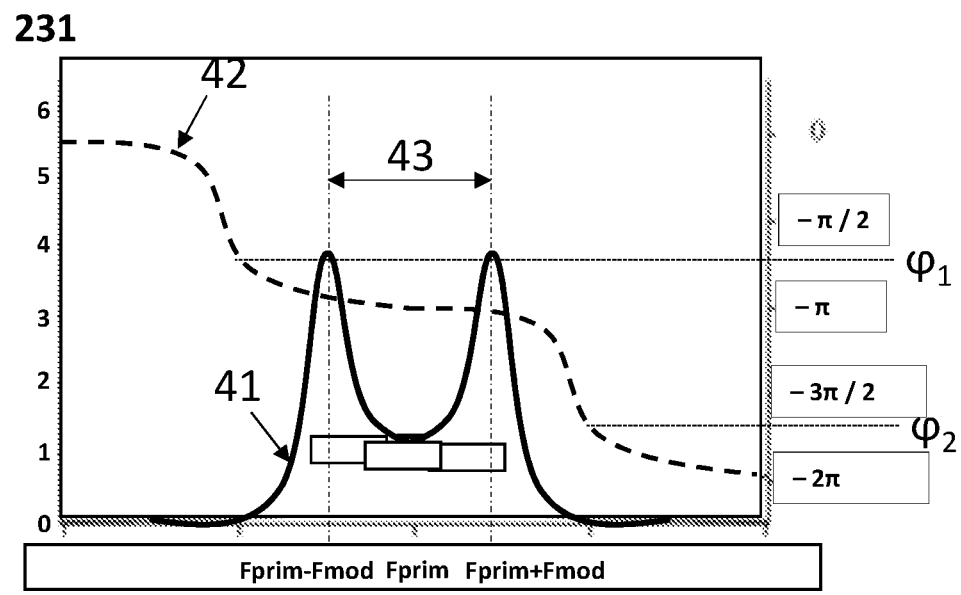
FIG. 4 illustrates the oscillation amplitude and oscillation phase of a mechanical resonator with force-feedback.

The filter in 23 advantageously has a resonance peak that roughly coincides with the secondary resonant frequency, making the force-feedback narrow band and stable in the presence of higher order resonant modes. The resonance of 23 and the force-feedback circuit together change the secondary oscillation response of the Coriolis mass. FIG. 3 illustrates the oscillation amplitude 31 and the oscillation phase 32 of a typical mechanical resonator around the resonance frequency without force-feedback. In contrast, FIG. 4 illustrates schematically a corresponding system where a filter 23 and a force-feedback circuit are used. FIG. 4 shows the frequency-dependence of the conditioned sense signal 231. The curve 41 illustrates the oscillation amplitude as a function of frequency and curve 42 shows the oscillation phase as a function of frequency. The phase at the center frequency must be $-\pi$ in order to have a stable feedback loop. The feedback creates a frequency band 43 around the primary oscillation frequency $F_{prim}$ where the oscillation phase of the Coriolis mass does not anymore change rapidly as a function of frequency and the amplitude is nearly constant, contrary to FIG. 3.

The frequency response illustrated in FIG. 4 makes the gyroscope much less sensitive to any discrepancies between the primary oscillation frequency $F_{prim}$ and the secondary resonant frequency $F_{sec}$ than would be the case without feedback. In the spectrum illustrated in FIG. 3, even a small shift of the secondary resonant frequency away from the value $F_{prim}$ could shift the phase of the mechanical output signal to such an extent that part of the signal induced by the Coriolis force could wrongly be detected as a quadrature signal and cancelled by a quadrature compensation mechanism. Similarly, a portion of the quadrature signal would be falsely interpreted as a component of the mechanical output signal, which would introduce an offset error to the sense signal. In contrast, a small change which shifts the secondary resonant frequency away from the value $F_{prim}$ in a mechanical resonator with the response illustrated in FIG. 4 would link the true sense signal much less to quadrature errors or vice versa, because no great differences in oscillation phase would be introduced by such a shift. However, when great accuracy is required, even this small shift can't be ignored. It is possible to cancel even this small error by forcing the phase of the secondary frequency response to stay constant by locking it to the primary frequency.

Secondly, if force-feedback would be implemented on a mechanical oscillator which has the oscillation spectrum shown in FIG. 3, the secondary mechanical resonance frequency may relatively easily shift so far from the primary oscillation frequency that the amplitude will decrease significantly, which could impair the signal-to-noise ratio of the sense signal. Force-feedback operation will greatly decrease the influence of the drift on the amplitude and phase of the sense signal but the signal-to-noise ratio will be still affected since the undamped secondary resonance characteristic will determine the loop gain and thus the noise cancellation factor. For best possible signal-to-noise ratio in force-feedback operation, the secondary resonant frequency $F_{sec}$ should differ from the primary oscillation frequency $F_{prim}$ by less than the required sense signal bandwidth. A typical sense signal bandwidth for an automotive gyroscope is 100 Hz and a typical primary oscillation frequency is 20 kHz. The signal quality is not in practice impaired at all if the drift of the secondary resonant frequency can be kept below 20 Hz, i.e. 0.1% of the operating frequency. In a practical gyroscope the initial mismatch and drift of the frequencies may be up to 2% of the center frequency, resulting in a 400 Hz difference between the primary oscillation and secondary resonant frequencies. If such a frequency difference would occur, the signal-to-noise ratio would be degraded by a factor of four. This degradation can be avoided if the secondary frequency response can be locked to the primary frequency so that the secondary resonant frequency closely coincides with the primary oscillation frequency. The flat area of the amplitude and phase response of FIG. 4 denoted as 43 is typically 20% of the center frequency. A suitable modulation frequency $F_{mod}$ may for example be greater than 1 kHz, so that modulation sidebands will lie within the flat portion 43 but beyond the frequency range where the difference between primary oscillation and secondary resonant frequencies is likely to drift and beyond the signal bandwidth.

The sense signal 212 now contains two side-band frequencies. They must be removed from the conditioned sense signal 231 before it is fed to the sensor output. This can be easily accomplished with standard filtering methods, preferably in the digital domain (not illustrated in FIG. 2a) as long as $F_{mod}$ is much larger than the sense signal bandwidth.

However, the conditioned sense signal 231 which contains the two sideband frequencies can be used for forcing the secondary resonant frequency $F_{sec}$ to remain equal to the primary oscillation frequency $F_{prim}$. For this purpose, the gyroscope comprises a frequency-feedback circuit which is coupled to the readout circuit and the force-feedback circuit. The frequency-feedback circuit comprises a sideband demodulator 25 which receives the conditioned sense signal 231 containing the two sideband frequencies as input. The sideband demodulator 25 also receives as input a demodulation signal 252 which corresponds to the modulation signal 222 by which the mechanical oscillation was modulated.

The sidebands are located in the frequency response so that the lower has a phase shift $\varphi_1$ and the upper a phase shift $\varphi_2$, as FIG. 4 illustrates. It can be shown that these phase shifts can be written as $\Delta\varphi=\pi+(\varphi_1+\varphi_2)/2$ and $\varphi=(\varphi_1-\varphi_2)/2$, where $\varphi$ is the average phase distance from the $-\pi$ point and $\Delta\varphi$ is the common deviation from phase symmetry with respect to the $-\pi$ point. The conditioned sense signal 231 can then be written as:

$$C31=-\sin(\omega_{mod}t+\varphi)\sin(\omega_{prim}t+\Delta\varphi)=-\sin(\omega_{mod}(t+\tau_d)) \sin(\omega_{prim}t+\Delta\varphi) \quad (2)$$

The sign of the conditioned sense signal 231 is opposite to the single sideband signal 223; in other words it is phase shifted by −π. With respect to this phase shift, the modulation at frequency $\omega_{mod}=2\pi F_{mod}$ has an additional phase shift of φ and the carrier at frequency $\omega_{prim}=2\pi F_{prim}$ has an additional phase shift of Δφ. In other words it may be said that the modulation will experience a group delay $\tau_d$ equal to the phase slope of the frequency response ($\tau_d=(\varphi_1-\varphi_2)/(2\omega_{mod})$) and the carrier will experience a phase shift that depends on the average phase of the sidebands. This means that the demodulation signal 252 should preferably be phase-shifted by φ, but it also means that the demodulated signal 253 will have the average phase change of the side bands Δφ, which is representative of the phase change of the secondary system at the primary oscillation frequency. This is true if the sideband frequencies are not located too far from the center frequency; they should be within the flat portion 43 of FIG. 4.

The frequency-feedback circuit forces Δφ to zero by changing the secondary resonant frequency. This circuit comprises phase comparator 26 which compares the phase of the demodulated signal 253 to the phase of a reference signal 2211, for example utilizing the methods described below. The reference signal 2211 may be the drive tracking signal 221, or a signal which has been produced by phase-shifting the drive tracking signal 221. The phase comparator 26 produces a phase comparison signal 261 which has an amplitude proportional to the detected phase difference. The frequency-feedback circuit comprises a controller 27 which receives the phase comparison signal 261 and, if the phase comparison signal has a nonzero value, uses it to adjust the secondary resonant frequency $F_{sec}$ of the Coriolis mass. The phase comparison signal 261 can either be fed directly to the controller 27, or it can be passed through an optional low-pass filter 28 to produce a filtered phase comparison signal 262 which is then fed to the controller 27. In FIG. 2a, this adjustment is made by applying a frequency-adjusting (voltage) signal 271 to frequency-control transducers (not illustrated) coupled to the Coriolis mass.

It is well known that due to a non-linear voltage-displacement dependence in some electrostatic transducers an effective negative spring constant component is generated that can be controlled by the voltage applied to the transducer. This phenomenon is also called electrostatic spring softening. By controlling the negative spring constant component, the resonant frequency can be shifted downwards by the applied voltage.

The controller may form a frequency-control voltage based on the phase comparison signal. The controller then outputs the frequency-control voltage to a frequency-control transducer which is coupled to the Coriolis mass. The controller imposes an effective negative spring force on the Coriolis mass and keeps the sense signal phase shift at −π at the primary resonant frequency $F_{prim}$ by keeping the secondary resonant frequency $F_{sec}$ equal to the primary oscillation frequency $F_{prim}$.

The frequency-control transducers may for example be same transducers as the sense transducers mentioned above, or separate frequency-feedback transducers dedicated only for frequency control. The force-feedback transducers are less suited for frequency control since the output signal amplitude would then be affected by the frequency control voltage. It is well known that constant force can be generated by a electrostatic transducer by applying either a DC-voltage or an AC voltage at sufficiently high frequency so that the Coriolis mass is virtually motionless at this frequency. By using DC-voltage for detection or feedback and AC-voltage for frequency control or vice versa (AC-voltage for detection or feedback and DC-voltage for frequency control), a complete separation of these functions may be achieved in the same transducer. In principle it would be possible to also control the primary oscillation frequency, but it is very difficult to design frequency control transducers that would be compatible with the high amplitude of the primary motion.

In other words, the phase of the sense signal is compared to the phase of the reference signal, which contains the phase of the primary oscillation of the Coriolis mass. If the phase difference is −π, then $F_{sec}$ is necessarily equal to $F_{prim}$ because the phase shift of the feedback loop at the secondary resonant frequency equals to −π. If there is a phase difference, then the magnitude of that phase difference is proportional to the frequency difference between $F_{sec}$ and $F_{prim}$ according to the frequency response curve 4 and the secondary resonant frequency $F_{sec}$ can be forced toward the value $F_{prim}$ by the frequency-feedback circuit.

Figure 5A:
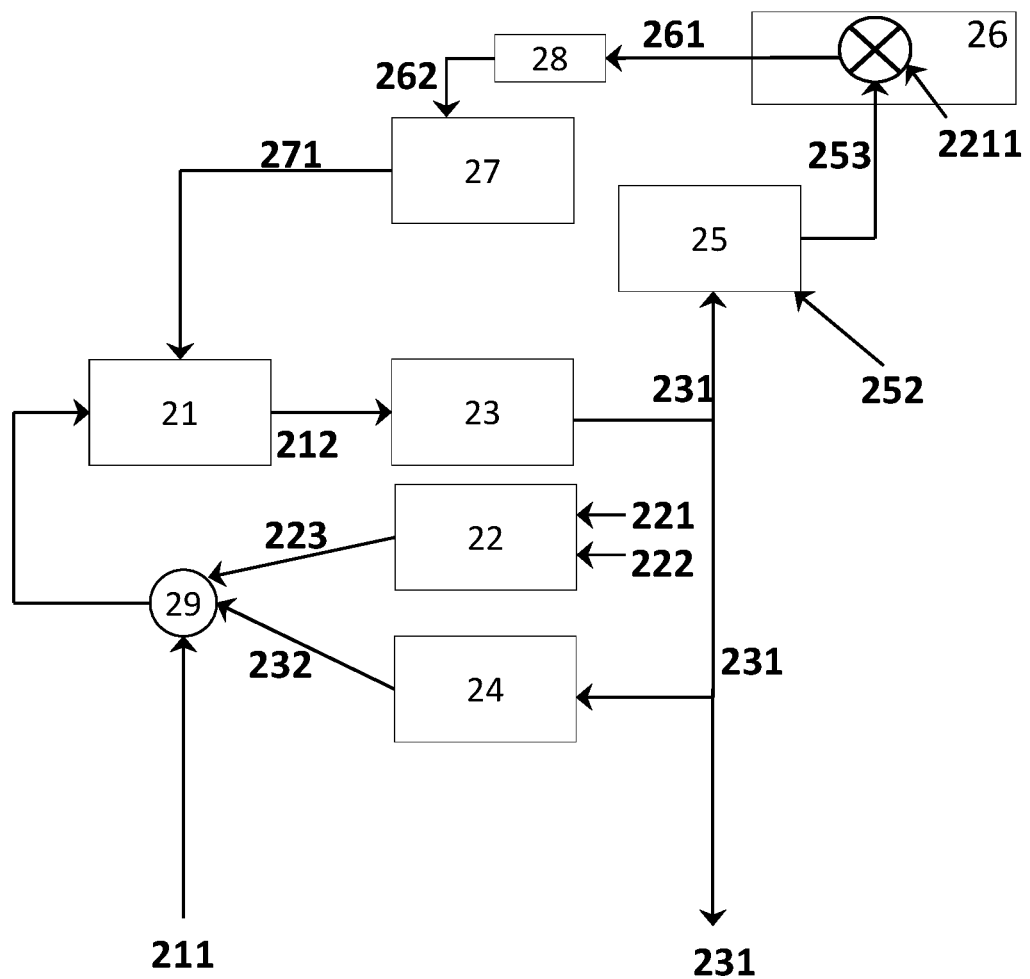
FIGS. 5a-5b illustrate phase comparator options.

A suitable phase comparator 26 may be a multiplier. In this case, the reference signal 2211 may be a phase-shifted drive tracking signal which is produced by transforming the original drive-tracking signal 221 into quadrature phase. This phase-shifted drive tracking signal is then transmitted to the phase comparator 26. When the demodulated sense signal 253 is multiplied in phase comparator 26 by the reference signal 2211, the resulting phase comparison signal 261 will have a DC-component proportional to the phase-shift of the demodulated sense signal 253 with respect to 2211. FIG. 5a illustrates a frequency-feedback circuit where the comparator is a multiplier.

Figure 5B:
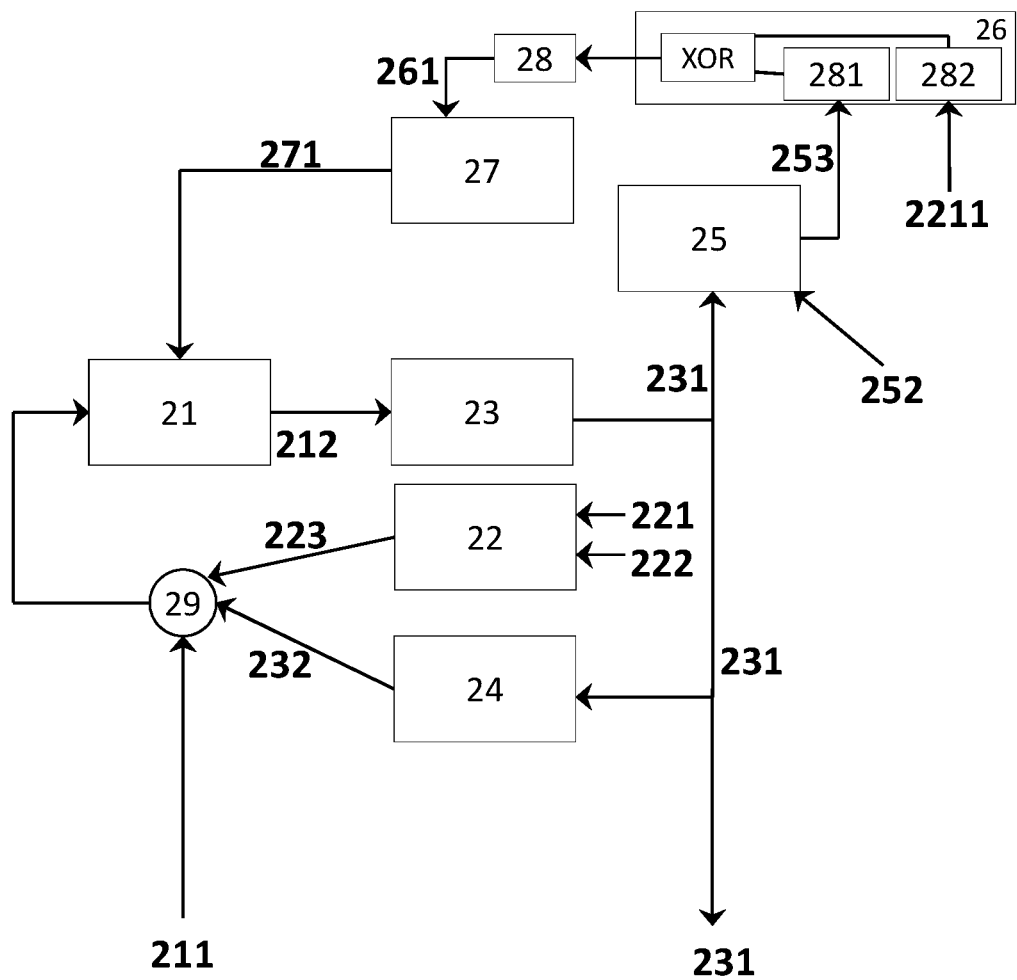

Another possible phase detector is a digital XOR-gate. The signals have to be converted to square wave signals if this option is used, and the reference signal 2211 may in this case be the original drive tracking signal, without any phase-shifting. FIG. 5b illustrates a frequency-feedback circuit where the comparator 26 comprises a first sine-to-square conversion element 281 which converts the demodulated sense signal 253 into a square wave and a second sine-to-square conversion element 282 which converts the reference signal 2211 into a square wave. The comparator further comprises an XOR-gate which retrieves the square waves as two inputs and outputs a false (0) output when the inputs are equal and a true output (1) when the inputs are not equal. 28 is an optional low-pass filter as before.

Figure 6A:
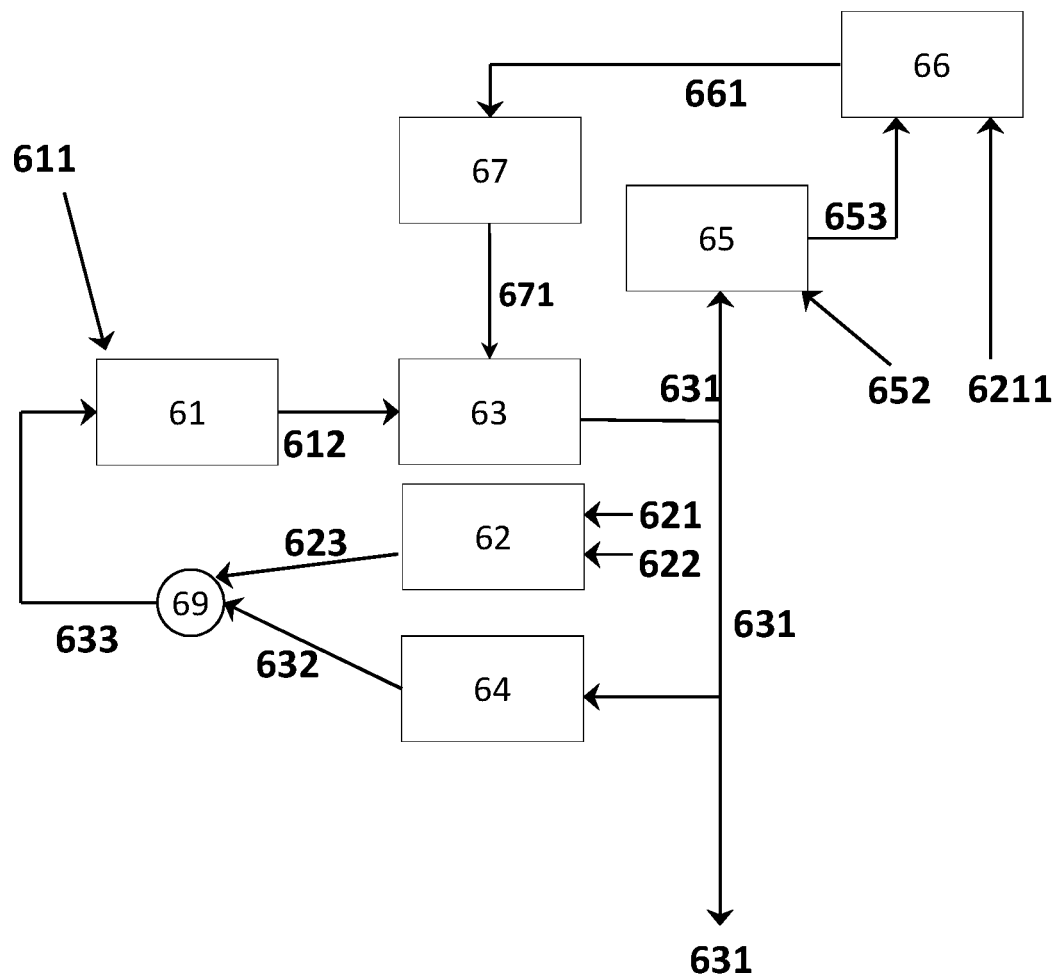
FIGS. 6a-6b illustrate frequency-feedback options.
Figure 6B:
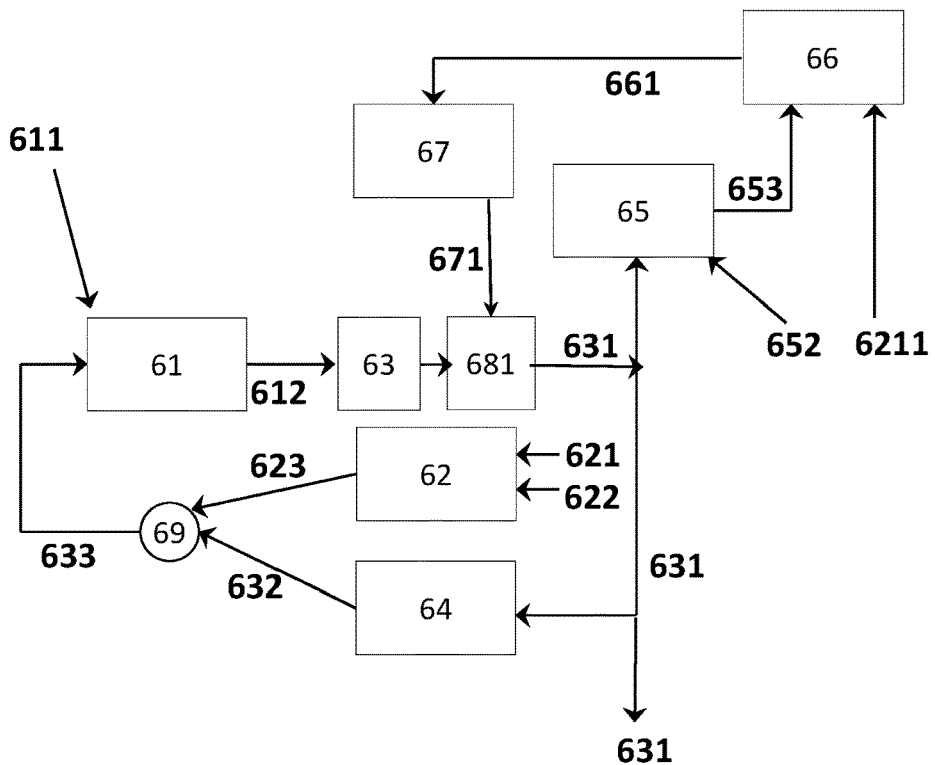

FIGS. 6a-6b illustrate two alternative ways in which the frequency-feedback can be implemented. Reference numbers 61, 611-612, 62, 621-623, 6211, 63, 631-633, 64, 65, 651-652, 66, 661, 67, 671 and 69 correspond to reference numbers 21, 211-212, 22, 221-223, 2211, 23, 231-233, 24, 25, 251-252, 26, 261, 27, 271 and 29, respectively, in FIG. 2a. In FIG. 6a, the controller 67 outputs a frequency-adjusting signal 671 directly to the low-pass filter 63, so that this filter is locked to the primary oscillation frequency $F_{prim}$.

In FIG. 6a the controller is configured to form a frequency-control signal based on the phase comparison signal and to output the frequency-control signal to the filter in the readout circuit. The controller keeps the sense signal phase shift equal to −π at the primary oscillation frequency $F_{prim}$ by frequency-locking the filter to the primary frequency. In this case, the controller helps in avoiding phase-shift related issues that may mix the in-phase signal and the quadrature signal, but it doesn't help in maintaining the signal-to noise ratio at an optimal value.

In FIG. 6b, the readout circuit comprises a phase shifter 681 which receives the sense signal from the filter 63. The controller 67 is configured to form a frequency-control signal 671 based on the phase comparison signal and to output the frequency-adjusting signal 671 to the phase shifter 681. This changes the phase of the sense signal 631 until it matches the phase difference at the phase comparator 66. The controller thereby keeps the sense signal phase shift at $-\pi$ at the primary resonant frequency $F_{prim}$. Also in this case, the controller helps in avoiding phase-shift related issues that may mix the in-phase and quadrature signals, but it doesn't help in maintaining the signal-to noise ratio at optimal value.

The modulation may also be implemented elsewhere in the gyroscope circuits, especially if many functions in the readout circuit, force-feedback circuit and frequency-feedback circuit are in the digital domain. The sideband signal may in this case be a digital signal which is imparted to the force-feedback system by outputting the sideband signal to the low-pass filter 63.

Figure 7A:
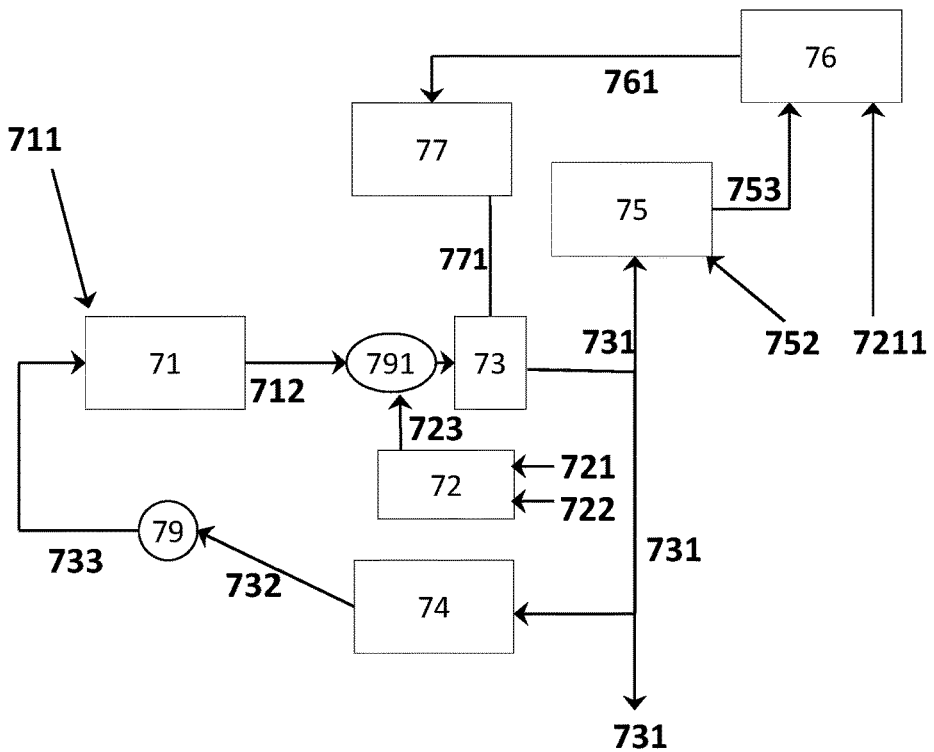
FIGS. 7a-7b illustrate an optional modulation route and the resulting frequency response.

FIG. 7a illustrates a gyroscope where reference numbers 71, 711-712, 721-722, 7211, 731-733, 74, 75, 751-752, 76, 761, 77, 771 and 79 correspond to reference numbers 21, 211-212, 221-222, 2211, 231-233, 24, 25, 251-252, 26, 261, 27, 271 and 29, respectively, in FIG. 2a. The two-sideband modulator produces a digital sideband signal 723 from the input signals 721 and 722 which is summed in summing element 791 to the digitalized sense signal and then forwarded to digital filter 73.

Figure 7B:
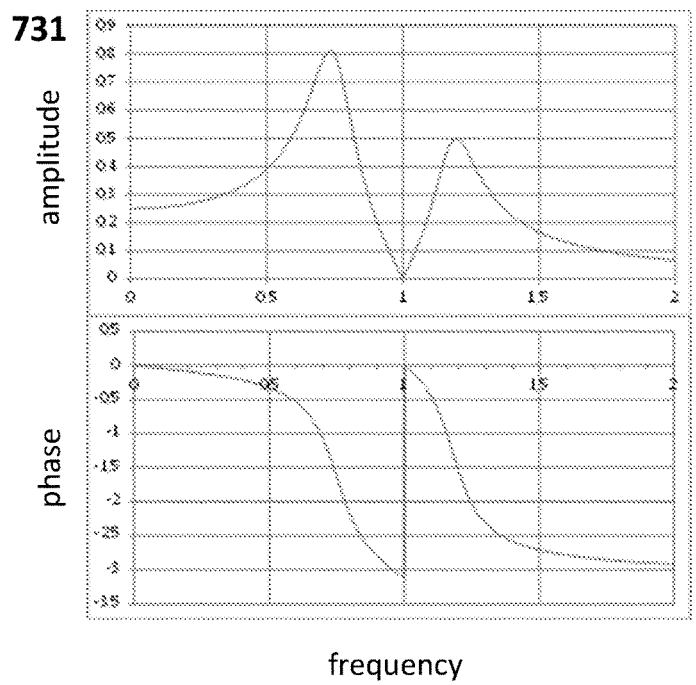

In this case the sense signal 731 obtains the frequency response illustrated in FIG. 7b, where the upper figure illustrates the amplitude in relative linear units and the lower figure shows the phase in radians. In equation 2, $\varphi=(\varphi_1-\varphi_2)/2$ will in this case be close to $\pi/2$, so the demodulation signal 752 must be close to quadrature phase in relation to the modulation signal 722.

Gyroscope Embodiment

Figure 8A:
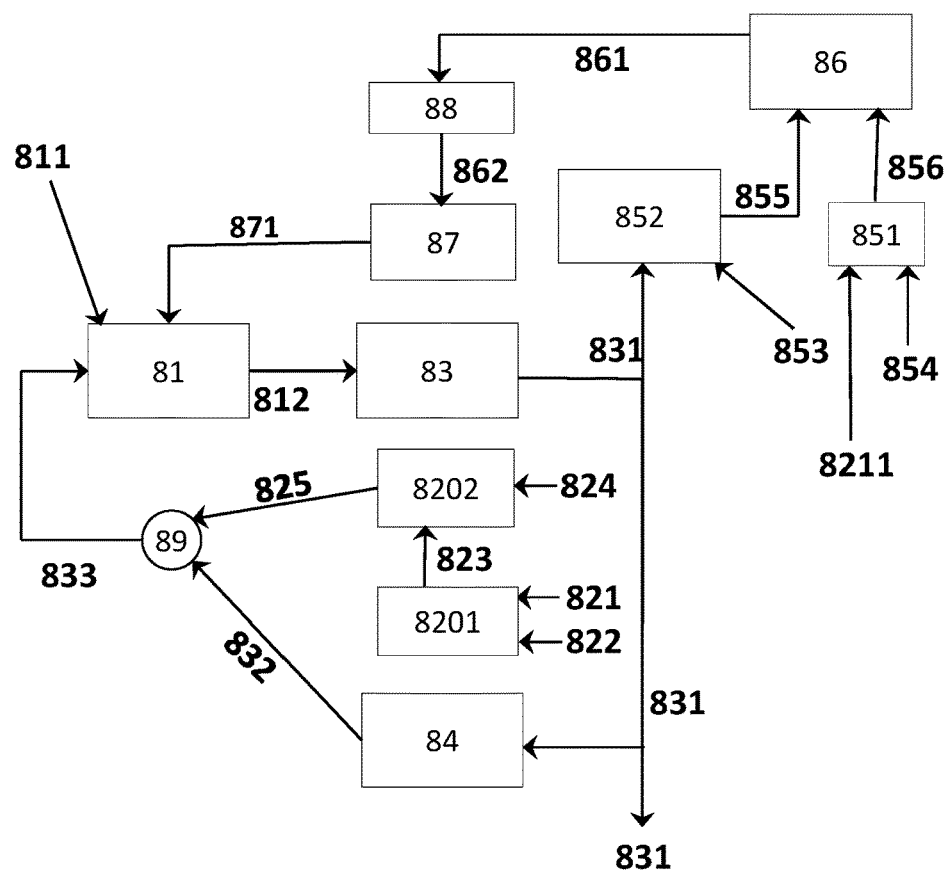
FIG. 8a illustrates a gyroscope with multiple modulators in series.

FIG. 8a illustrates a gyroscope with a modulation path where multiple modulators are connected in series. Reference numbers 81, 811-812, 821, 8211, 822, 823, 83, 831-833, 84, 86, 861-862, 87, 871, 88 and 89 correspond to reference numbers 21, 211-212, 221, 2211, 222, 223, 23, 231-233, 24, 26, 261-262, 27, 271, 28 and 29, respectively, in FIG. 2a. Furthermore, any of the options described with reference to FIGS. 5a-5b, 6a-6b and 7a-7b can also be implemented in the device illustrated in FIG. 8a.

The device illustrated in FIG. 8a comprises a first sideband modulator 8201 and a second sideband modulator 8202. The first sideband modulator 8201 receives as input the drive tracking signal 821 and a first modulation signal 822. The first sideband modulator 8201 thereby produces a once-modulated first sideband signal 823 in the same manner as the first sideband modulators produced the sideband signal 223 presented in the general discussion. The frequency of the first modulation signal 822 may be relatively low, for example between 100-1000 Hz.

The modulating frequency may for example be such that the sideband frequencies deviate no more than 10% from the primary oscillation frequency and fall within the band 43 of FIG. 4. This ensures that the phase shift of the signal at the sideband frequencies is representative of the phase shift at the primary oscillation frequency. If the modulating frequency is for example 10% of the primary oscillation frequency and the modulation signal is generated through division by ten from the drive tracking signal, then the demodulation signal can also be generated by division by ten but with some phase shift, or in other words, delay compared to the modulation signal to compensate for the group delay of the force-feedback loop.

It may also be advantageous to modulate the drive tracking signal in quadrature phase with respect to the Coriolis-force induced mechanical input signal. This way small asymmetries and inaccuracies that may leave some residual signal at the primary frequency will be in quadrature phase and not mixed with the Coriolis-force induced signal.

The second sideband modulator 8202 receives the once-modulated first sideband signal 823 as input and multiplies it with a second modulation signal 824 to produce a twice-modulated second sideband signal 825 which is then imparted to the force-feedback transducer.

The gyroscope comprises a first sideband demodulator 851 and a second sideband demodulator 852. The first sideband demodulator 851 is in this case configured to receive the reference signal 8211 as input and to demodulate the reference signal 8211 at the first modulation frequency before it enters the phase comparator 86 as a first comparator input 855. The second sideband demodulator 852 is configured to receive the filtered sense signal 831 as input and to demodulate the filtered sense signal 831 at the second modulation frequency before it enters the phase comparator 86 as a second comparator input 856.

If the group delay caused by the resonator feedback loop is small, the demodulation signal 853 may be the same as the second modulation signal 824 and demodulation signal 854 may be the same as the first modulation signal 822. If the group delay needs to be compensated for, then the demodulation signal may be phase-shifted or time-delayed from the corresponding modulation signal. This applies also in the embodiments presented below.

The once-demodulated first comparator input 855 will not comprise the modulation produced by the second modulation signal 824 and the second sideband modulator 8202, but it will still comprise the modulation produced by the first modulation signal 822 and first sideband modulator 8201.

The phase comparator 86 thereby receives the first comparator input 855, which is the once-demodulated filtered sense signal, and compares its phase to that of the second comparator input 856, which is the which is the once-demodulated reference signal. If a sinusoidal external vibration produces product components, they will average out in the low-pass filter 88. If there has been a phase shift in the secondary oscillation (from the nominal phase of $-\pi$), that shift will produce a DC component in the filtered phase comparison signal 862. This phase comparison signal can be used for frequency-adjustment in any manner which was described above with reference to FIG. 2a, 6a-6b or 7a.

The first sideband demodulator could alternatively be configured to receive the reference signal 8211 as input and to demodulate the reference signal at the second modulation frequency before it enters the phase comparator, and the second sideband demodulator could then be configured to receive the filtered sense signal 831 as input and to demodulate the filtered sense signal at the first modulation frequency before it enters the phase comparator. This option has not been separately illustrated.

Figure 8B:
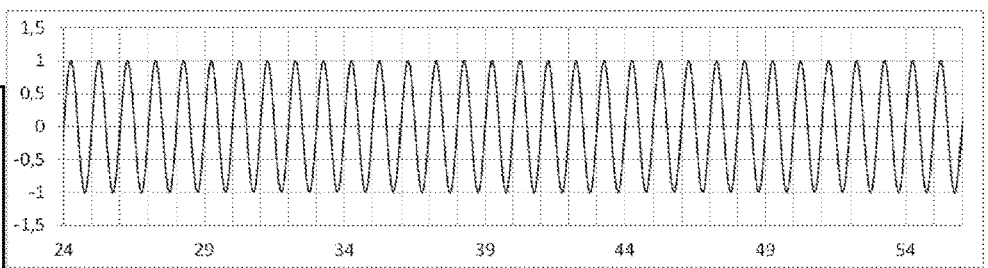
Figure 8C:
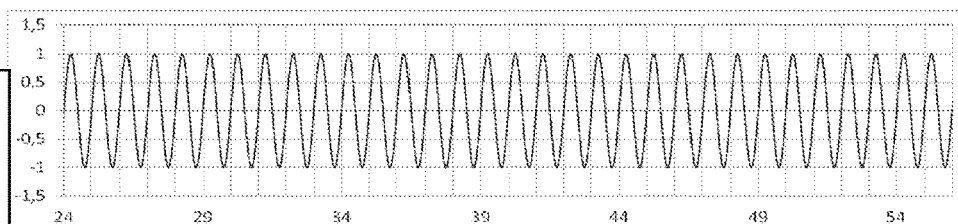
Figure 8C:
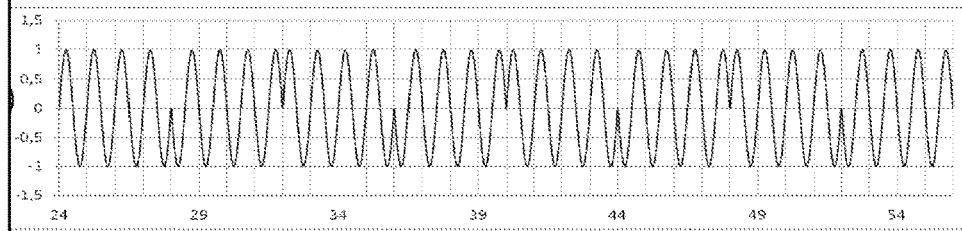
Figure 8C:
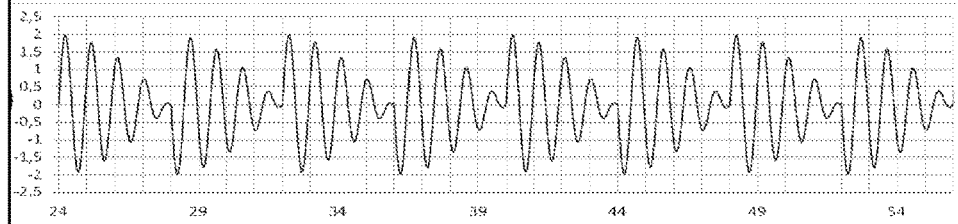
Figure 8C:
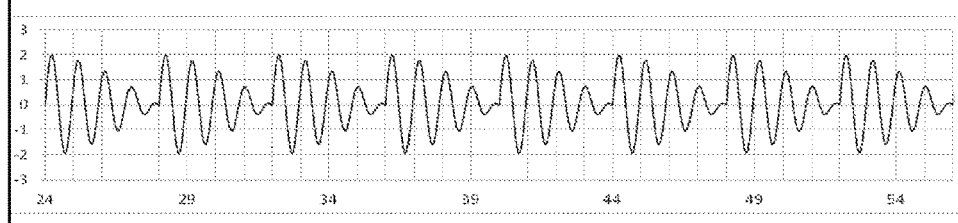
Figure 8C:
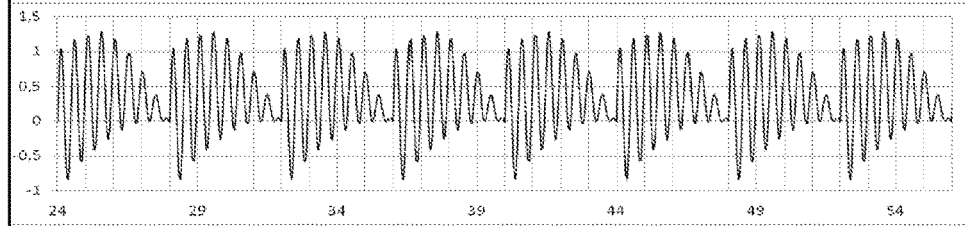
Figure 8C:
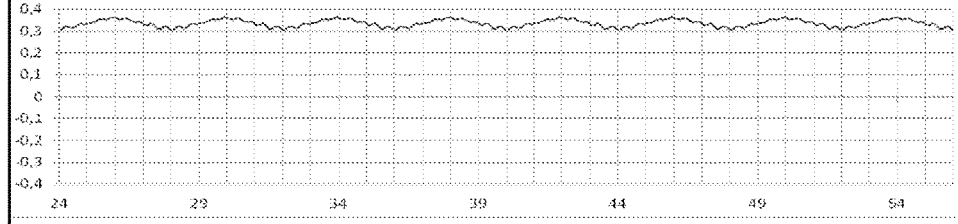
Figure 8C:
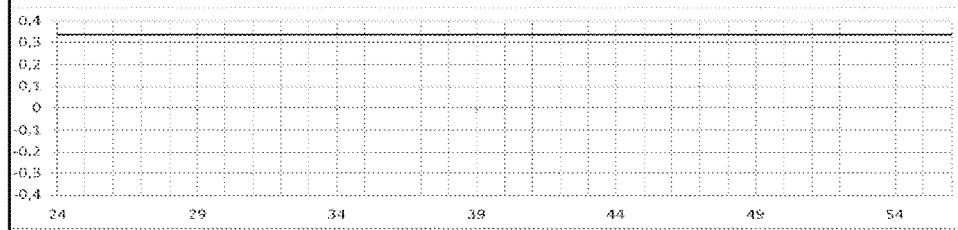

The technical significance of double modulation can be illustrated by comparing the signals generated for example in the device illustrated in FIG. 2a to those generated in the device illustrated in FIG. 8a. FIG. 8b illustrates an example simulation of signals 221, 223, 231, 253, 261 and 262 when the system of FIG. 2a is operating without external disturbances (and with no discrepancy between the primary oscillation and secondary resonant frequencies). FIG. 8c illustrates an example simulation where an external vibration signal has been added to the mechanical input signal 211. This external vibration signal has a frequency and amplitude which are equal those of the upper sideband of the signal 223. The phase comparison signal 261 now obtains a constant nonzero value which cannot be removed by lower frequency low-pass filtering, as seen in the filtered phase comparison signal 262. The external vibration can thereby cause a false frequency adjustment.

Figure 8D:
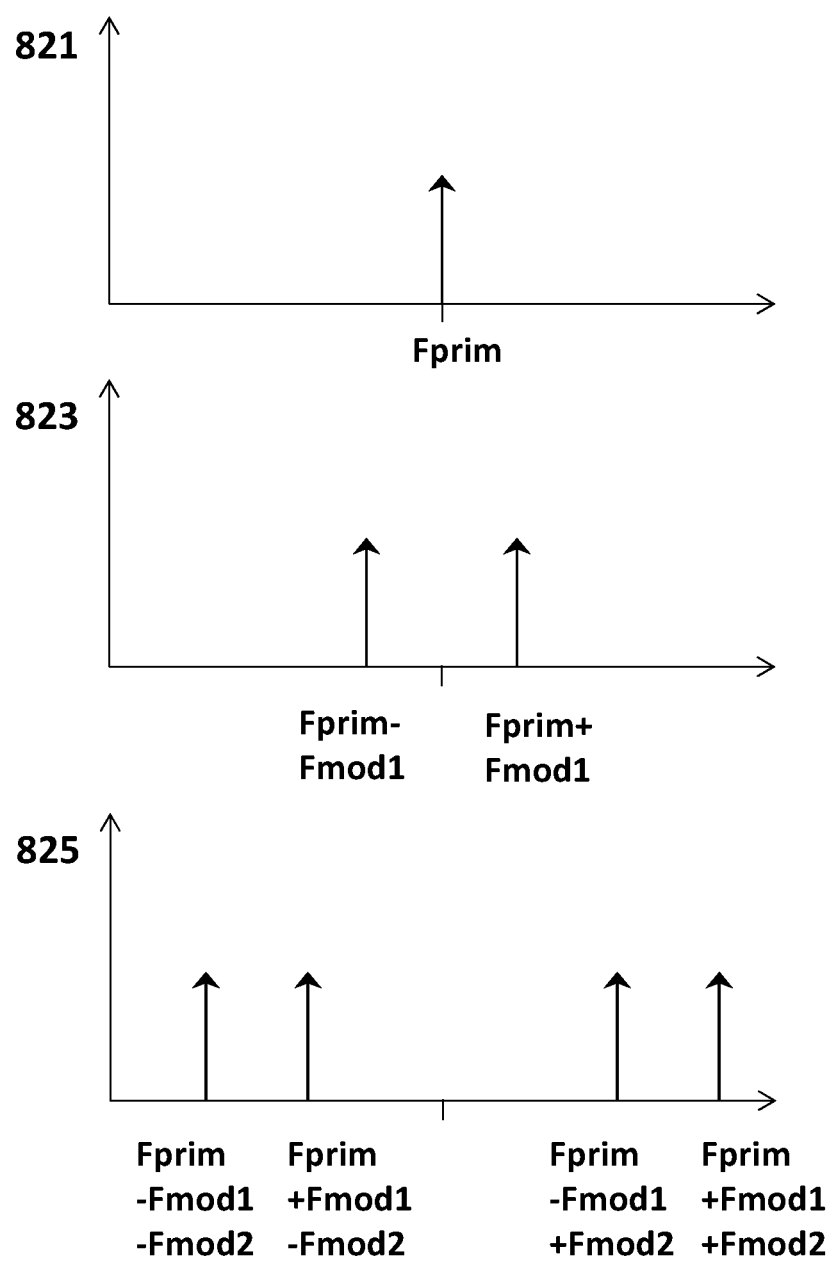
Figure 8E:
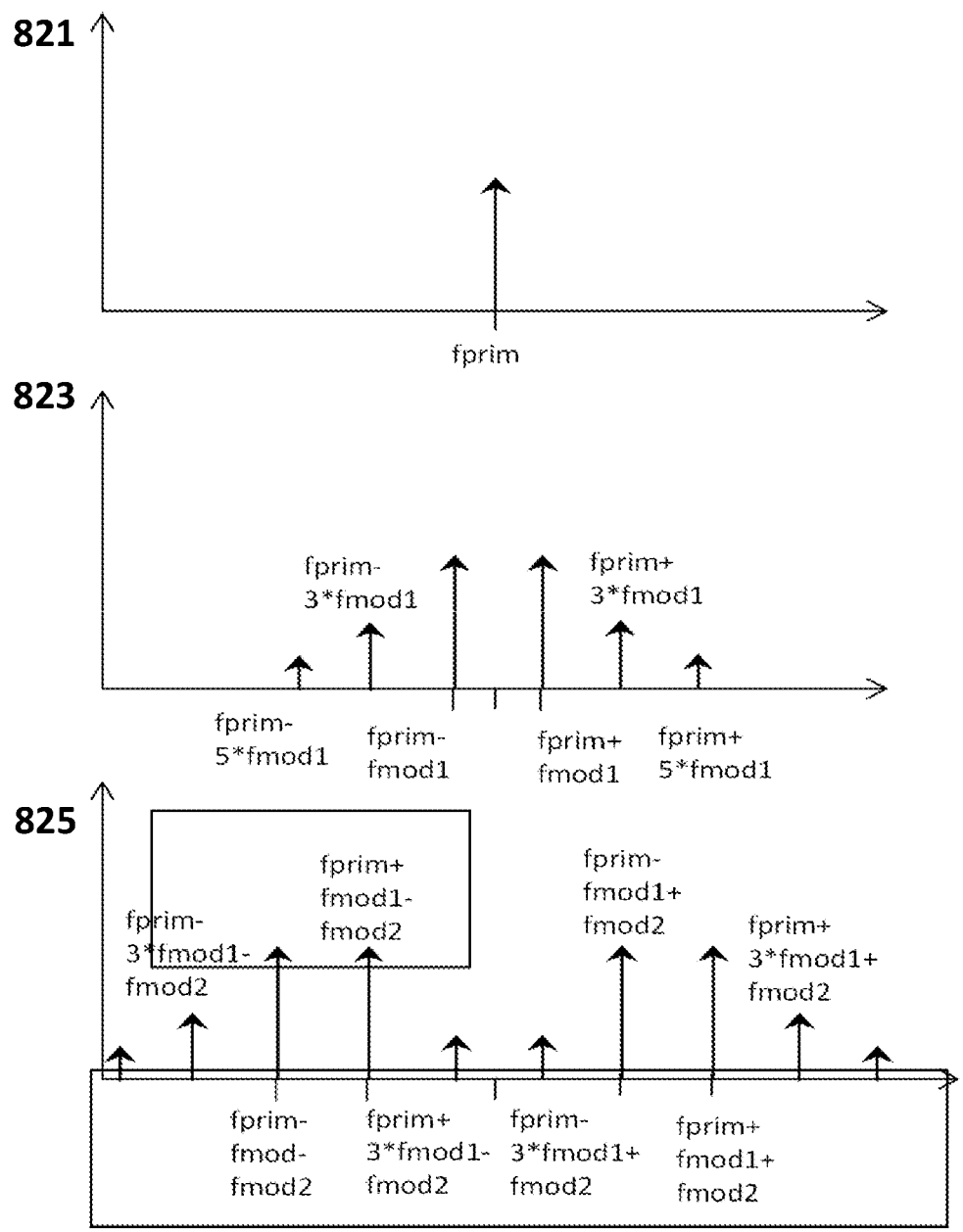

FIG. 8*d* illustrates the frequency spectra of the drive tracking signal 821, the once-modulated first sideband signal 823 and the twice-modulated second sideband signal 825 when sinusoidal modulation is applied. FIG. 8*e* illustrates the same spectra when square-wave modulation is used.

Figure 8F:
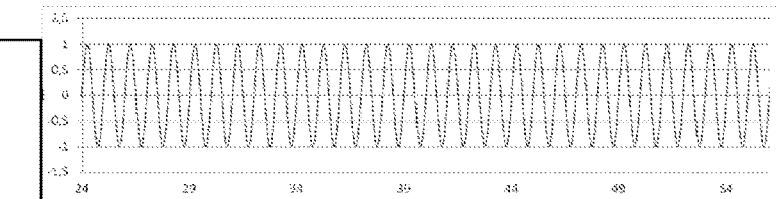
Figure 8F:
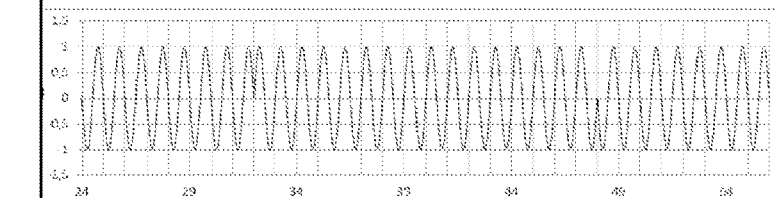
Figure 8F:
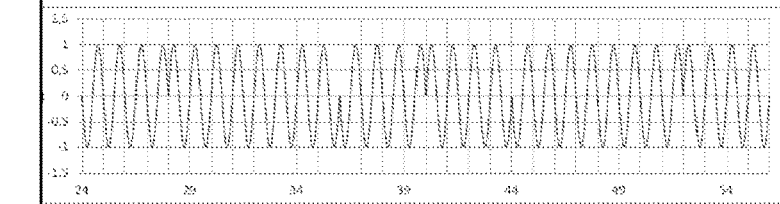
Figure 8F:
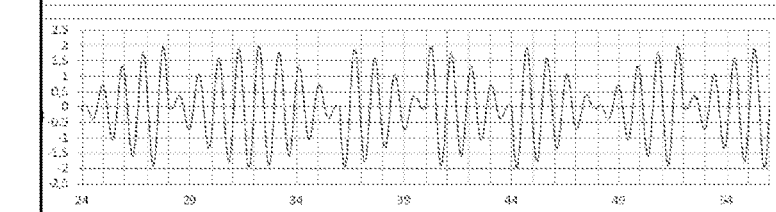
Figure 8F:
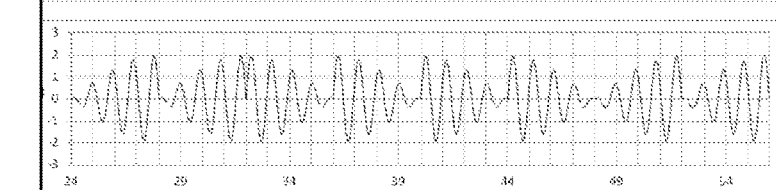
Figure 8F:
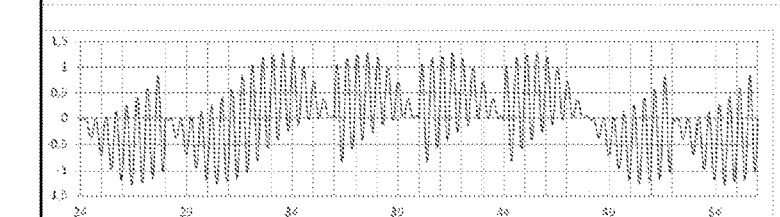
Figure 8F:
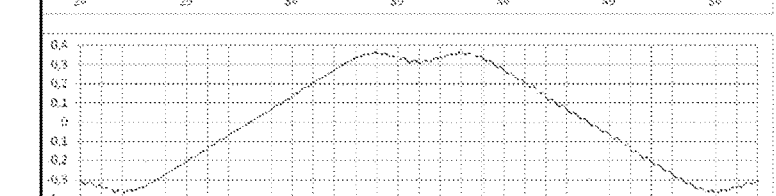
Figure 8F:
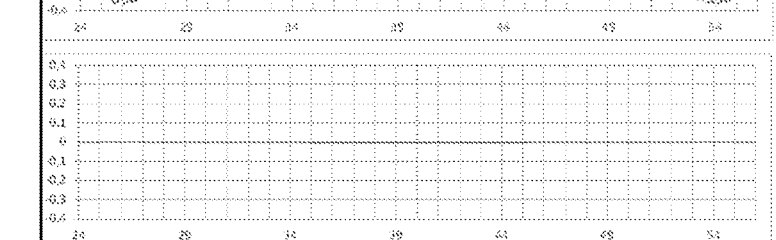

FIG. 8*f* illustrates simulated waveforms for signals 821, 823, 825, 831, 854, 861 and 862 in an example where the system of FIG. 8*a* is operating under the same external disturbance which was used in FIG. 8*c* (and without a discrepancy between the primary oscillation and secondary resonant frequencies, as in the previous example), with square-wave modulation in the force-feedback signal. In these examples, the first modulation frequency $F_{mod1}$ was chosen to be 1/32 of the primary oscillation frequency $F_{prim}$, and the second modulation frequency $F_{mod2}$ was chosen to be 1/8 of the primary oscillation frequency $F_{prim}$. This selection of frequencies produces sidebands where no signal component lies close to the frequency of the drive tracking signal even if square wave modulation is used.

In FIG. 8*f*, the frequency feedback system which was described with reference to FIG. 8*a* still leaves a nonzero low-frequency component in the filtered phase comparison signal 862. However, this component can be entirely filtered by setting the corner frequency of the filter 88 to a low enough value. The external vibration will in this case leave no remaining DC-component in the filtered phase comparison signal 862. The frequency adjustment can thereby operate as usual even in the presence of external vibrations.

Figure 8G:
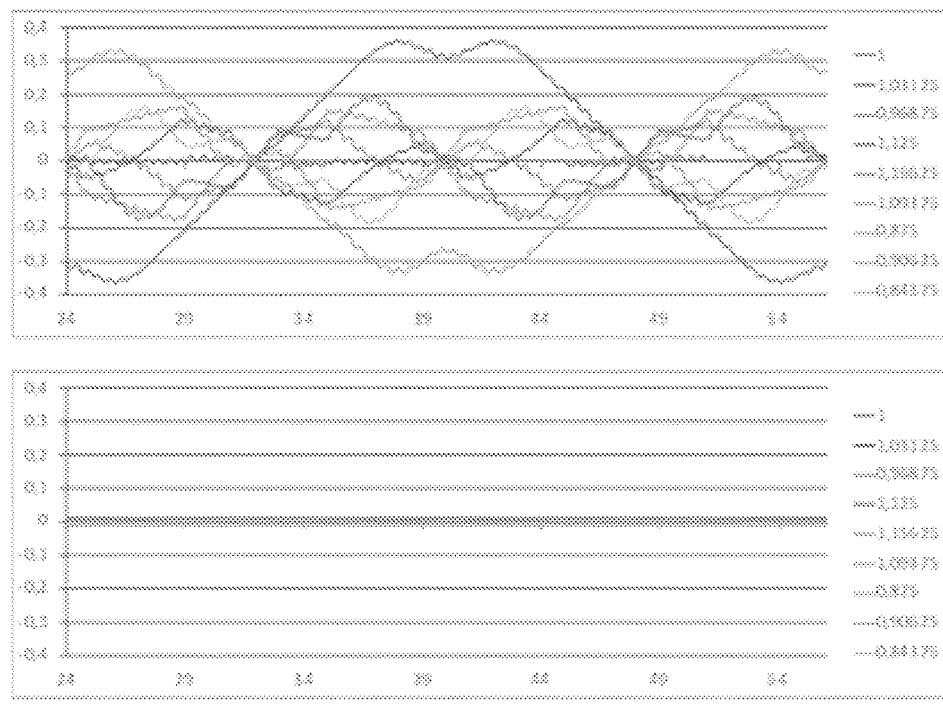

It can be shown that the system illustrated in FIG. 8*a* is insensitive to external vibrations at any of the sidebands or related frequencies illustrated in FIGS. 8*d* and 8*e*. FIG. 8*g* illustrates simulated waveforms for signal 862 where an external vibration has been introduced at each of the sidebands shown in the bottom graph in FIG. 8*e*, and also at the primary frequency. A suitable low corner frequency in the low-pass filter 88 will in each case leave a negligible DC component in the filtered phase comparison signal 862. The case which was illustrated in more detail in FIG. 8*f* was in fact the most difficult one, and the influence of the external vibration can be reliably cancelled in each case. These considerations also apply to the embodiments which will be presented next.

Figure 8H:
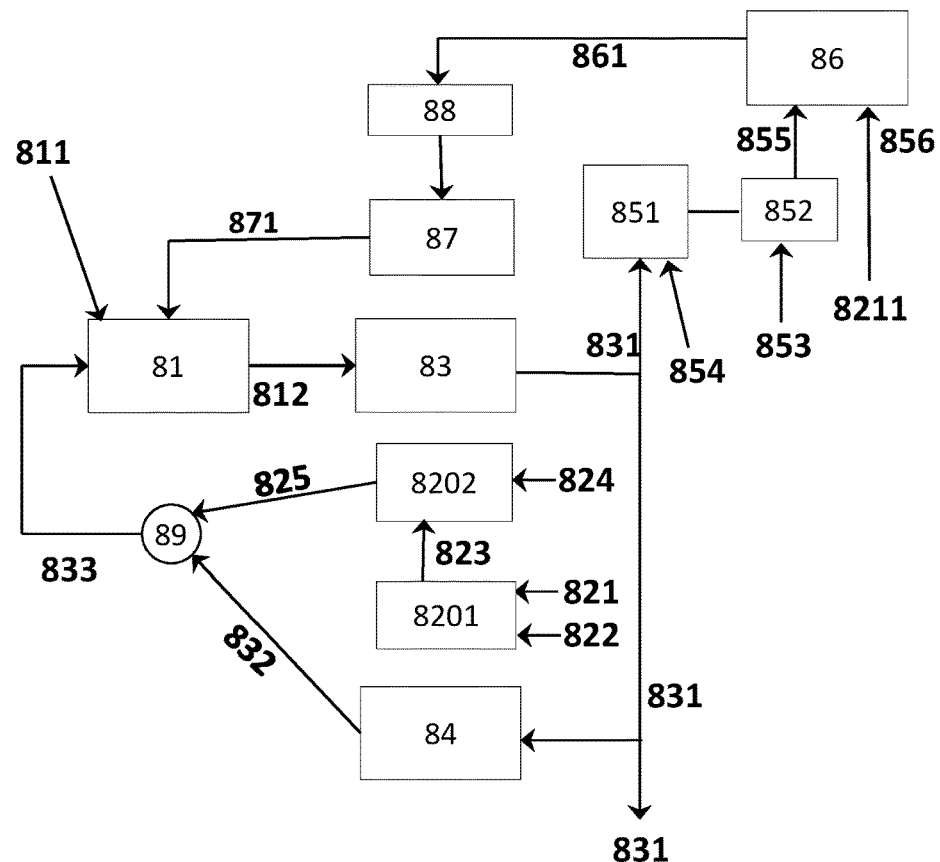
FIG. 8h illustrates an alternative embodiment where the sense signal is demodulated twice.

FIG. 8*h* illustrates an alternative embodiment where the sense signal is demodulated twice but the reference signal is not demodulated. The first sideband demodulator and second sideband demodulator are here connected in series and configured to receive the filtered sense signal as input and to demodulate the filtered sense signal at the first modulation frequency and second modulation frequency, respectively, before it enters the phase comparator. In other words, the first demodulator 851 receives the filtered sense signal 831 as input and demodulates it at the first modulation frequency provided by demodulation signal 854. The first demodulator then outputs the once-demodulated filtered sense signal to the second demodulator 852, which demodulates it at the second modulation frequency provided by demodulation signal 853. The twice-demodulated filtered sense signal is then sent to the comparator 86 as first comparator input 855. The reference signal 8211 enters the comparator 86 directly as second comparator input 856 without demodulation.

Figure 8I:
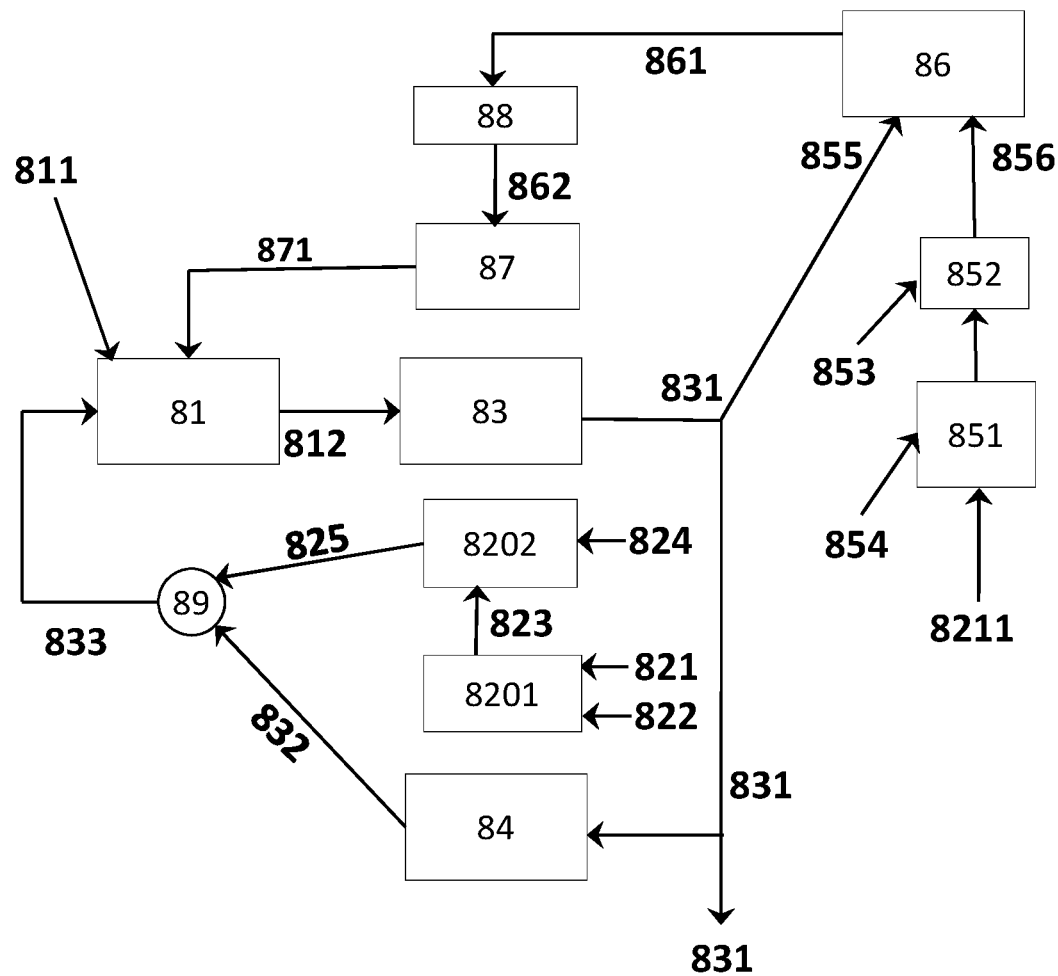
FIG. 8i illustrates an alternative embodiment where the reference signal is demodulated twice.

Finally, FIG. 8*i* illustrates an alternative embodiment where the reference signal is demodulated twice but the sense signal is not demodulated. The first sideband demodulator and second sideband demodulator are connected in series and configured to receive the reference signal as input and to demodulate the reference signal at the first modulation frequency and second modulation frequency, respectively, before it enters the phase comparator. In other words, the first demodulator 851 receives the reference signal 8211 as input and demodulates it at the first modulation frequency provided by demodulation signal 854. The first demodulator then outputs the once-demodulated reference signal to the second demodulator 852, which demodulates it at the second modulation frequency provided by demodulation signal 853. The twice-demodulated reference signal is then transmitted to the comparator 86 as second comparator input 856. The filtered sense signal 831 enters the comparator 86 directly as first comparator input 855 without demodulation.

Practical Modulators and Demodulators

An ideal modulator is a multiplier circuit that multiplies two sinusoidal signals. It is, however, quite difficult to design and manufacture at low cost low power analogue multipliers. Instead, simpler circuits may be used that can produce modulated signals that closely resemble those of an analog multiplication of sinusoidal signals. By way of example, the reference numbers of FIG. 2*a* will be used to refer to the signals.

Figure 9A:
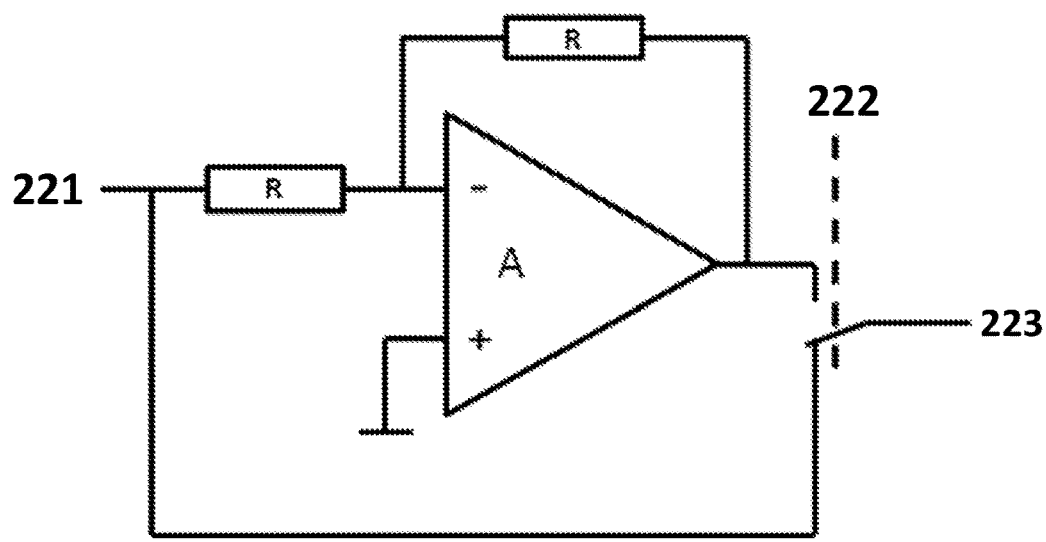
FIGS. 9a-9e illustrate practical modulators and demodulators.

FIG. 9*a* illustrates a circuit that can easily produce a square wave modulation. The same circuit can be used also as a de-modulator. The drive tracking signal 221 is inverted with an inverting amplifier, and at the modulating frequency $F_{mod}$ (the frequency of modulation signal 222) the output is altered between the non-inverted and the inverted signal.

Figure 9B:
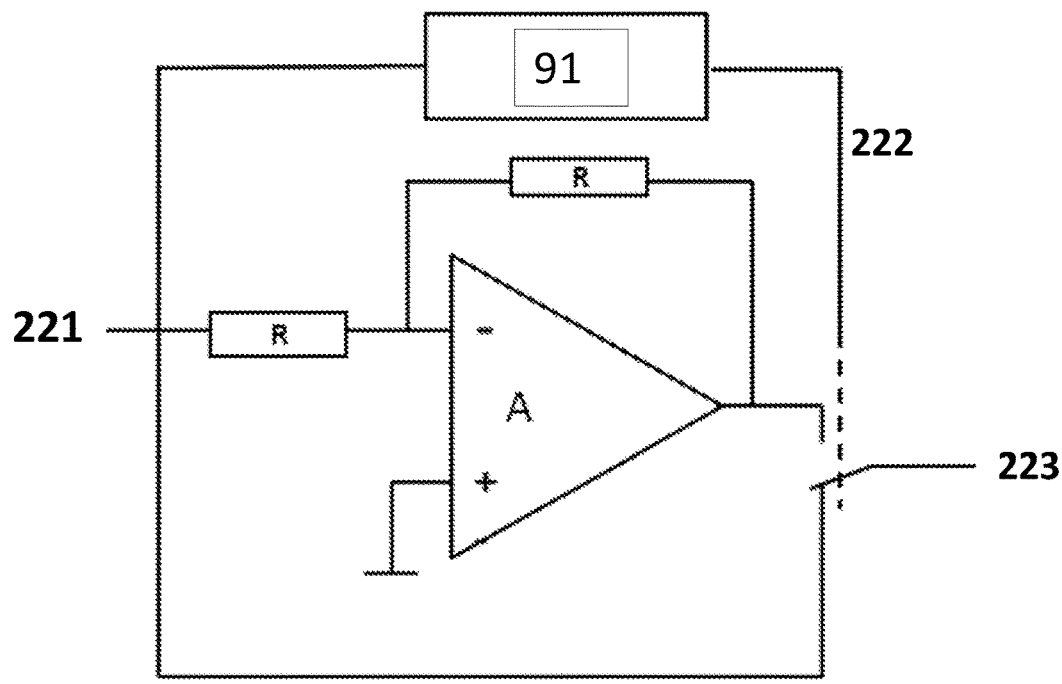

It is convenient if the modulating frequency $F_{mod}$ is derived from the primary frequency $F_{prim}$ by division by an integer or half integer. Then it is only needed to count the periods (or half periods) and change the modulating switch position when a pre-determined number of counts have been reached. FIG. 9*b* illustrates a circuit where a frequency divider generates the modulation signal 222 from the drive tracking signal 221.

Figure 9C:
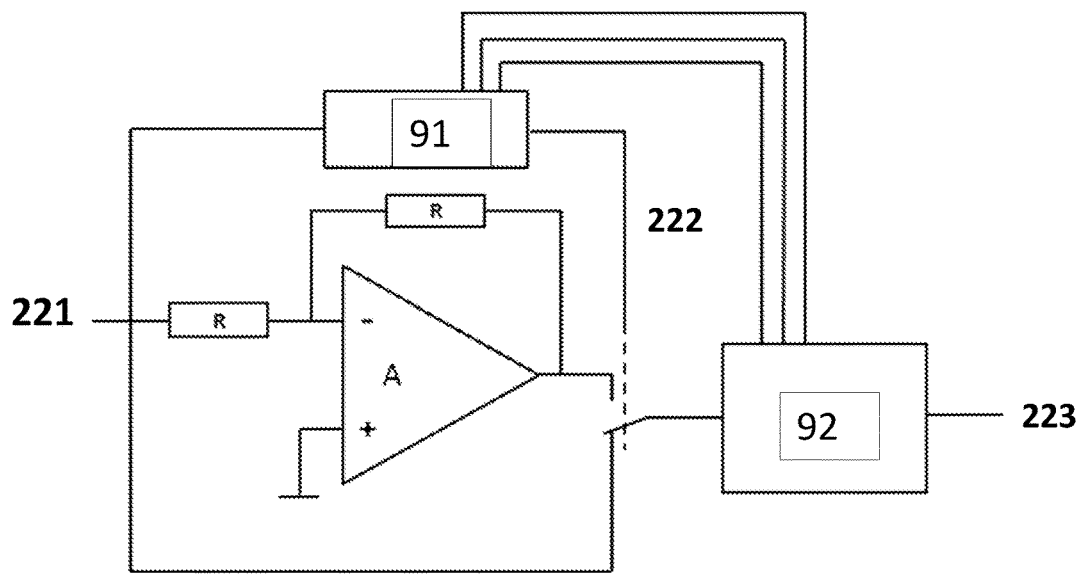

Harmonic sidebands produced by the simple modulator/de-modulator of FIG. 9*b* can be easily avoided by providing an additional variable gain stage 92 also controlled by the frequency divider 91, as shown in FIG. 9*c*. The gain 92 will be modulated at discrete steps that may change every half-period of the drive tracking signal 221.

Figure 9D:
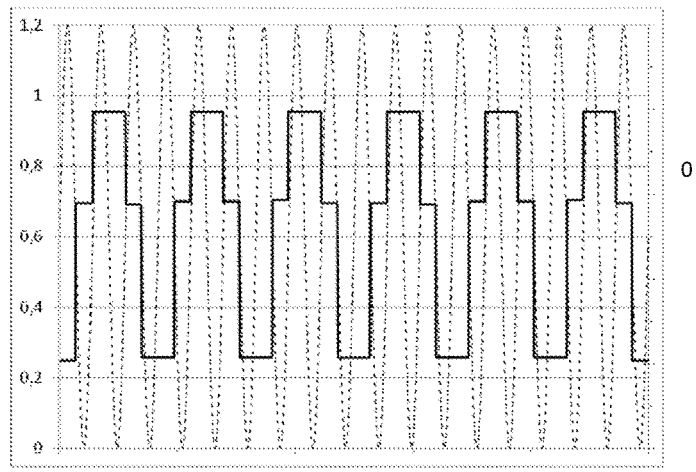
Figure 9E:
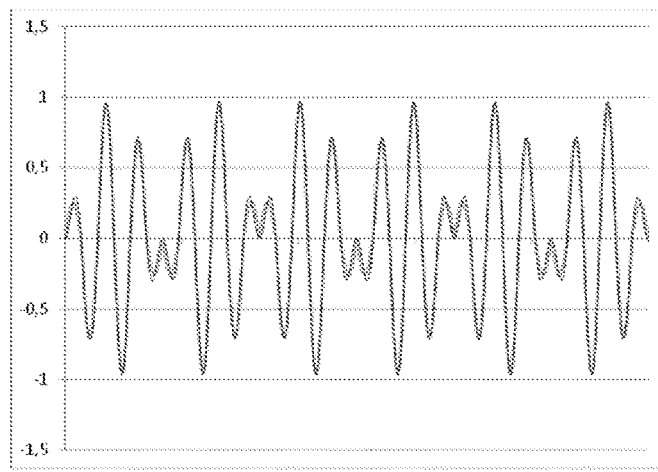

An example of such a signal is given in FIG. 9*d*, where the gain value of the gain stage 92 as a function of time is indicated by the solid line. Gain values are shown on the left vertical axis. The dashed line is the drive tracking signal 221, and its zero point is indicated on the right axis. The gain value may be programmed to change at the zero crossings of the drive tracking signal 221. For simplicity only three gain values are needed in this example, since the modulating signal frequency $F_{mod}$ is one third of the primary oscillation frequency. The lower the modulating frequency, the more gain values are required for accurate reproduction of sinusoidal modulation. FIG. 9*e* shows as the solid gray line the modulated waveform of the modulator of FIG. 9*c*, with the gain values of FIG. 9*d*. As a reference, the waveform of a signal modulated by a sinusoidal signal is shown with a dashed line (the waveform illustrated in FIG. 2*c*). The difference between these waveforms is so small that it has no practical consequences.

Demodulation may also be performed with a similar controlled gain stage. The gain values should then be inverse numbers of those shown in FIG. 9d. However, in demodulation the effect from square-wave demodulating signal may be negligible for the operation of the system since the low-pass filter present will filter out all generated harmonic frequencies.

It is also possible to perform the modulation in the digital domain, as FIG. 7a illustrates. In this case the drive tracking signal 721 has to be AD-converted before modulation. The modulated signal 723 could be converted back to the analogue domain and then added to the feed-back signal (this option is not illustrated), but it may often be more advantageous to use the digital summing node 78 of FIG. 7a if the low pass filter 73 is also implemented in digital domain. No DA-conversion of the modulated signal 723 is then needed.

Filtering the Modulation from the Output Signal

The modulated signal may be completely removed from the final gyroscope output after synchronous detection with an in-phase primary frequency signal by sampling the final output signal at the modulation frequency. This will cause a set of zeros to the sinc-function type frequency response at the modulating frequency and its harmonics. According to the Nyquist theorem the largest usable bandwidth will then be half of the modulating frequency.

The invention claimed is:

1. A microelectromechanical gyroscope comprising:
at least one Coriolis mass which is coupled to a drive transducer, wherein the drive transducer receives as input a drive signal and actuates the Coriolis mass into primary oscillation movement at a primary oscillation frequency $F_{prim}$, whereby the Coriolis mass is configured to be actuated into secondary oscillation movement by the Coriolis force when the gyroscope undergoes angular rotation, wherein the secondary oscillation has a secondary resonant frequency $F_{sec}$;
a drive sensing circuit comprising a drive sensing transducer which is coupled to the Coriolis mass and configured to generate an original drive tracking signal which tracks the primary oscillation movement of the Coriolis mass;
a readout circuit comprising a sense transducer which is coupled to the Coriolis mass and configured to generate a sense signal which tracks the secondary oscillation movement of the Coriolis mass, and wherein the readout circuit comprises a filter which receives the sense signal as input and outputs a filtered sense signal; and
a force-feedback system comprising a force-feedback transducer coupled to the Coriolis mass and a force feedback circuit coupled to the force-feedback transducer, wherein the force feedback circuit is configured to receive the filtered sense signal and the original drive tracking signal as input and to output to the force-feedback transducer a force-feedback signal;
wherein the force-feedback circuit comprises a first sideband modulator which is configured to receive the original drive tracking signal as input, to modulate the original drive tracking signal with a first modulation frequency and to output a first sideband signal,
wherein the force-feedback circuit further comprises a second sideband modulator which is configured to receive the first sideband signal as input, to modulate the first sideband signal with a second modulation frequency and to output a second sideband signal,
and the force-feedback circuit further comprises a summing element which is configured to receive the filtered sense signal and the second sideband signal as input, to sum them together to generate the force-feedback signal and to output the force-feedback signal to the force-feedback transducer,
and wherein the gyroscope further comprises a frequency-feedback circuit coupled to the readout circuit, and the frequency-feedback circuit comprises a phase comparator which is configured to receive the filtered sense signal and a reference signal as input, wherein the reference signal is either the original drive tracking signal or a phase-shifted drive tracking signal which differs from the original drive tracking signal only in its phase, and the phase comparator is further configured to compare the phase of the filtered sense signal with the phase of the reference signal and to output a phase comparison signal based on this comparison,
and wherein the frequency-feedback circuit further comprises a first sideband demodulator and a second sideband demodulator, and either the filtered sense signal or the reference signal is demodulated in the first sideband demodulator at the first modulation frequency before entering the phase comparator, and either the filtered sense signal or the reference signal is demodulated in the second sideband demodulator at the second modulation frequency before entering the phase comparator,
and wherein the frequency-feedback circuit further comprises a controller which is configured to receive the phase comparison signal as input and to use the phase comparison signal for keeping the sense signal phase shift at $-\pi$ at the primary resonant frequency $F_{prim}$.

2. A microelectromechanical gyroscope according claim 1, wherein the controller is configured to form a frequency-control voltage based on the phase comparison signal and to output the frequency-control voltage to a frequency-control transducer which is coupled to the Coriolis mass, whereby the controller imposes an effective negative spring force on the Coriolis mass and keeps the sense signal phase shift at $-\pi$ at the primary resonant frequency $F_{prim}$ by keeping the secondary resonant frequency $F_{sec}$ equal to the primary oscillation frequency $F_{prim}$.

3. A microelectromechanical gyroscope according to claim 1, wherein the controller is configured to form a frequency-control signal based on the phase comparison signal and to output the frequency-control signal to the filter in the readout circuit, whereby the controller keeps the secondary signal phase shift equal to $-\pi$ at the primary oscillation frequency $F_{prim}$ by frequency-locking the filter to the primary frequency.

4. A microelectromechanical gyroscope according to claim 1, wherein the readout circuit comprises a phase shifter which is configured to receive the sense signal from the filter, and the controller is configured to form a frequency-control signal based on the phase comparison signal and to output the frequency-adjusting signal to the phase shifter, which changes the phase of the sense signal until it matches the phase difference at the phase comparator, whereby the controller keeps the secondary signal phase shift equal to $-\pi$ at the primary oscillation frequency $F_{prim}$.

5. A microelectromechanical gyroscope according to claim 1, wherein the first sideband demodulator is configured to receive the reference signal as input and to demodulate the reference signal at the second modulation frequency before it enters the phase comparator, and the second sideband demodulator is configured to receive the filtered sense signal as input and to demodulate the filtered sense signal at the first modulation frequency before it enters the phase comparator.

6. A microelectromechanical gyroscope according to claim 1, wherein the first sideband demodulator is configured to receive the reference signal as input and to demodulate the reference signal at the first modulation frequency before it enters the phase comparator, and the second sideband demodulator is configured to receive the filtered sense signal as input and to demodulate the filtered sense signal at the second modulation frequency before it enters the phase comparator.

7. A microelectromechanical gyroscope according to claim 1, wherein the first sideband demodulator and second sideband demodulator are connected in series and configured to receive the filtered sense signal as input and to demodulate the filtered sense signal at the first modulation frequency and second modulation frequency, respectively, before it enters the phase comparator.

8. A microelectromechanical gyroscope according to claim 1, wherein the first sideband demodulator and second sideband demodulator are connected in series and configured to receive the reference signal as input and to demodulate the reference signal at the first modulation frequency and second modulation frequency, respectively, before it enters the phase comparator.

\* \* \* \* \*